(12) United States Patent
Matsumura

(10) Patent No.: US 10,598,516 B2
(45) Date of Patent: Mar. 24, 2020

(54) GRIPPING STATE DETECTION DEVICE

(71) Applicant: TOYOTA JIDOSHA KABUSHIKI KAISHA, Toyota-shi, Aichi-ken (JP)

(72) Inventor: Takeshi Matsumura, Numazu (JP)

(73) Assignee: TOYOTA JIDSOSHA KABUSHIKI KAISHA, Toyota-shi, Aichi-ken (JP)

( * ) Notice: Subject to any disclaimer, the term of this patent is extended or adjusted under 35 U.S.C. 154(b) by 248 days.

(21) Appl. No.: 15/708,660

(22) Filed: Sep. 19, 2017

(65) Prior Publication Data
US 2018/0087929 A1    Mar. 29, 2018

(30) Foreign Application Priority Data

Sep. 23, 2016  (JP) ................. 2016-185203

(51) Int. Cl.
| | | |
|---|---|---|
| *B62D 1/04* | (2006.01) | |
| *G01D 5/24* | (2006.01) | |
| *B62D 1/06* | (2006.01) | |
| *B60W 50/14* | (2020.01) | |
| *B60K 28/04* | (2006.01) | |

(52) U.S. Cl.
CPC .............. *G01D 5/24* (2013.01); *B62D 1/046* (2013.01); *B62D 1/06* (2013.01); *B60K 28/04* (2013.01); *B60W 2050/143* (2013.01); *B60W 2420/24* (2013.01)

(58) Field of Classification Search
CPC . G01D 5/24; B62D 1/046; B62D 1/06; B60K 28/04; B60W 2050/143; B60W 2420/24
See application file for complete search history.

(56) References Cited

U.S. PATENT DOCUMENTS

2018/0022374 A1*  1/2018  Fujikawa .............. B60R 16/037
                                                               219/204

FOREIGN PATENT DOCUMENTS

| JP | 2010-023699 A | 2/2010 |
|---|---|---|
| JP | 2014-153895 A | 8/2014 |
| JP | 2014-190712 A | 10/2014 |

* cited by examiner

*Primary Examiner* — David M. Gray
*Assistant Examiner* — Michael A Harrison
(74) *Attorney, Agent, or Firm* — Sughrue Mion, PLLC

(57) ABSTRACT

A gripping state detection device includes a steering state determination ECU that determines the gripping state of a driver with respect to the steering wheel of a vehicle. The steering state determination ECU determines which of a first steering state, a second steering state, and a hands-off state has occurred based on the electrostatic capacitance. The steering state determination ECU outputs a first determination result indicating that the steering wheel is gripped by the driver in a case where the determined state is the first steering state or the second steering state, and outputs a second determination result indicating that the steering wheel is not gripped by the driver in a case where the determined state is the hands-off state.

10 Claims, 17 Drawing Sheets

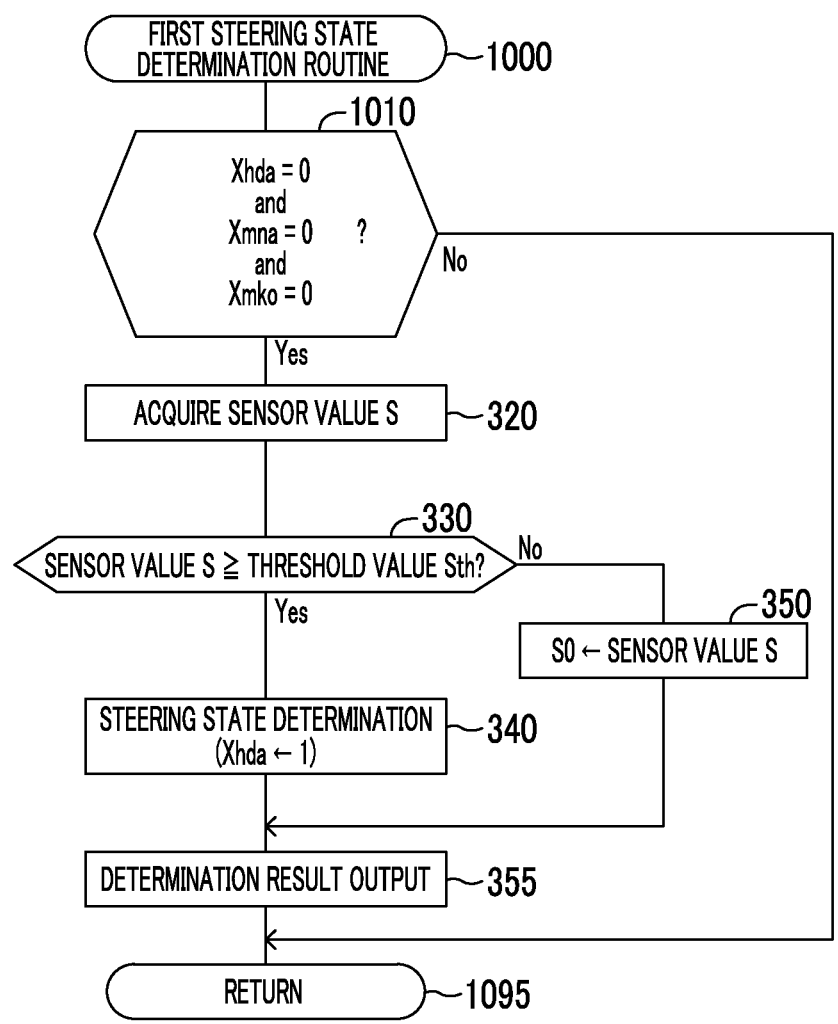

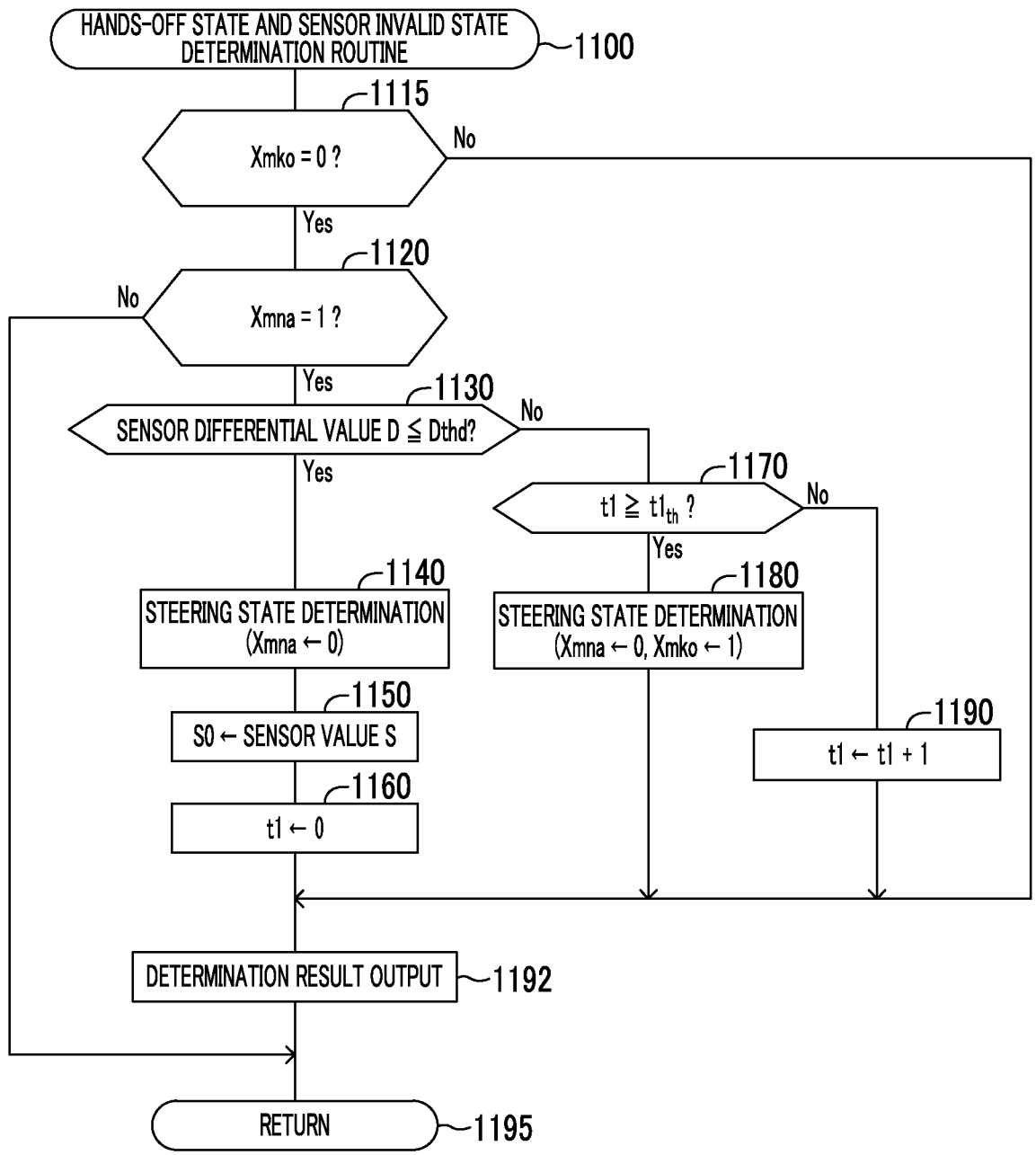

GRIPPING STATE DETECTION DEVICE

INCORPORATION BY REFERENCE

The disclosure of Japanese Patent Application No. 2016-185203 filed on Sep. 23, 2016 including the specification, drawings and abstract is incorporated herein by reference in its entirety.

BACKGROUND

1. Technical Field

The disclosure relates to a gripping state detection device for determining whether or not a driver is gripping a steering wheel of a vehicle steered by the driver.

2. Description of Related Art

A gripping state detection device (hereinafter, may be referred to as a "related art device") that detects a steering wheel gripping state based on a change in electrostatic capacitance detected by an electrostatic capacitance sensor, which is provided in a steering wheel of a vehicle operated by a driver, has been proposed (for example, refer to Japanese Unexamined Patent Application Publication No. 2014-190712 (JP 2014-190712 A).

SUMMARY

A general related art device performs determination as a "state in which the steering wheel is gripped by the driver" in a case where the electrostatic capacitance that changes according to the steering wheel gripping state exceeds a predetermined threshold value. Such a related art device performs determination as a "state in which the steering wheel is not gripped by the driver (state in which the driver releases his or her hand from the steering wheel)" in a case where the electrostatic capacitance falls below the threshold value again.

However, the electrostatic capacitance detected by the electrostatic capacitance sensor may change depending on the temperature, for example. Specifically, since the relative permittivity of a substance present between the electrode used for electrostatic capacitance detection and the body (hand) of the driver is influenced by a change in the temperature of the steering wheel, the measured value (electrostatic capacitance) of the electrostatic capacitance sensor may be changed.

Therefore, even in a case where the related art device determines that the "state in which the steering wheel is gripped by the driver" has occurred, if the temperature of the steering wheel rises, the electrostatic capacitance increases. For this reason, an increase in the electrostatic capacitance due to the temperature rise of the steering wheel exceeds a decrease in the electrostatic capacitance due to the driver releasing his or her hand from the steering wheel. As a result, there is a possibility that the electrostatic capacitance will not fall below the predetermined threshold value.

In practice, therefore, there is a possibility of erroneous determination as a "state in which the steering wheel is gripped by the driver" even though the driver releases his or her hand from the steering wheel.

The disclosure provides a gripping state detection device capable of precisely determining the gripping state of a driver with respect to a steering wheel even in a case where the temperature of the steering wheel changes.

A first aspect of the disclosure relates to a gripping state detection device including: an electrostatic capacitance measuring unit configured to measure an electrostatic capacitance that changes according to a gripping state of a driver with respect to a steering wheel of a vehicle; a temperature detector that detects a temperature of the steering wheel; and a controller configured to determine which of a first steering state that is a state in which it is certain that the steering wheel is gripped by the driver, a second steering state that is a state transitioning from the first steering state and is a state in which it is certain that the steering wheel is gripped by the driver, and a hands-off state that is a state in which it is certain that the steering wheel is not gripped by the driver or a possibility that the steering wheel is not gripped by the driver is high has occurred based on the electrostatic capacitance and output a first determination result, which indicates that the steering wheel is gripped by the driver, in a case where the determined state is the first steering state or the second steering state and, output a second determination result, which indicates that the steering wheel is not gripped by the driver, in a case where the determined state is the hands-off state.

The controller of the gripping state detection device according to the first aspect is configured to determine that the first steering state has occurred when the controller determines that the electrostatic capacitance is equal to or greater than a first threshold electrostatic capacitance in a case where the controller determines that the hands-off state has occurred. The controller of the gripping state detection device according to the first aspect is configured to determine that the second steering state has occurred when the controller determines that the electrostatic capacitance is smaller than a second threshold electrostatic capacitance, which increases as the temperature increases, in a case where the controller determines that the first steering state has occurred. The controller of the gripping state detection device according to the first aspect is configured to determine that the hands-off state has occurred when the controller determines that an electrostatic capacitance differential value, which is an amount of change per unit elapsed time of the electrostatic capacitance, is equal to or less than a first threshold electrostatic capacitance differential value in a case where the controller determines that the second steering state has occurred.

According to the first aspect, in a case where the "hands-off state" is determined, when the controller determines that the electrostatic capacitance is equal to or greater than the first threshold electrostatic capacitance, the controller determines that the "first steering state" has occurred. In a case where the "first steering state" is determined, the controller determines whether or not the electrostatic capacitance is a value smaller than the second threshold electrostatic capacitance. Even in a case where the electrostatic capacitance increases due to a rise in the temperature of the steering wheel, if the electrostatic capacitance is equal to or greater than the second threshold electrostatic capacitance, the second threshold electrostatic capacitance is set to a value by which the controller can determine that the driver is surely gripping the steering wheel.

On the other hand, a transition from the "state in which the steering wheel is gripped by the driver" to the "state in which the steering wheel is not gripped by the driver" cannot be concluded simply with the fact that the electrostatic capacitance has become smaller than the second threshold electrostatic capacitance. For example, in a case where the controller determines the "first steering state", if the temperature of the steering wheel further increases in a situation where the gripping state of the steering wheel does not change, the electrostatic capacitance may become smaller than the second threshold electrostatic capacitance according to an increase in the second threshold electrostatic capacitance. For this reason, even if the electrostatic capacitance becomes less than the second threshold electrostatic capacitance in a case where the controller determines the "first steering state", a transition to the "state in which the steering wheel is not gripped by the driver" cannot be concluded.

Therefore, in the gripping state detection device according to the first aspect, in a case where the controller determines that the "first steering state" has occurred, when the controller determines that the electrostatic capacitance is smaller than the second threshold electrostatic capacitance, the controller determines that the "second steering state" has occurred before the occurrence of a situation where the controller can clearly determine that the driver tries to release his or her hand from the steering wheel (that is, a situation where the electrostatic capacitance differential value that is the amount of change per unit elapsed time of the electrostatic capacitance is equal to or less than the first threshold electrostatic capacitance differential value). The second steering state is a state in which the steering wheel is gripped by the driver, and is a state in which the driver does not even try to release the steering wheel. That is, the "second steering state" is a state in which it is certain that the steering wheel is gripped by the driver.

In a case where the controller determines that the "second steering state" has occurred, when a situation where the controller can clearly determine that the driver tries to release his or her hand from the steering wheel occurs, it is not certain that the steering wheel is gripped by the driver. That is, a possibility that the steering wheel is not gripped by the driver is high. In this case, the gripping state detection device according to the first aspect determines that the "hands-off state" has occurred.

In a case where the controller determines that the "first steering state" or the "second steering state", which is a state in which it is certain that the steering wheel is gripped by the driver, has occurred, the first determination result indicating that the steering wheel is gripped by the driver is output. Therefore, a possibility that the second determination result indicating that the steering wheel is not gripped by the driver will be output even though a transition from the "state in which the steering wheel is gripped by the driver" to the "state in which the steering wheel is not gripped by the driver" does not occur can be reduced. As a result, for example, in a case where the gripping state detection device according to the first aspect is used in a system for calling driver's attention based on the second determination result, a possibility that the warning will be needlessly issued can be reduced.

In a case where the controller determines that the "hands-off state", which is a "state in which it is certain that the steering wheel is not gripped by the driver or a state in which a possibility that the steering wheel is not gripped by the driver is high", has occurred, the second determination result is output. Therefore, a possibility that the second determination result will not be output even though a transition from the "state in which the steering wheel is gripped by the driver" to the "state in which the steering wheel is not gripped by the driver" occurs can be reduced. As a result, for example, in a case where the gripping state detection device according to the first aspect is used in a system for calling driver's attention based on the second determination result, a possibility that the warning will not be issued when the warning is needed can be reduced.

A second aspect of the disclosure relates to a gripping state detection device including: an electrostatic capacitance measuring unit configured to measure an electrostatic capacitance that changes according to a gripping state of a driver with respect to a steering wheel of a vehicle; and a controller configured to determine which of a first steering state that is a state in which it is certain that the steering wheel is gripped by the driver, a second steering state that is a state transitioning from the first steering state and is a state in which it is certain that the steering wheel is gripped by the driver, and a hands-off state that is a state in which it is certain that the steering wheel is not gripped by the driver or a possibility that the steering wheel is not gripped by the driver is high has occurred based on the electrostatic capacitance and output a first determination result, which indicates that the steering wheel is gripped by the driver, in a case where the determined state is the first steering state or the second steering state and, output a second determination result, which indicates that the steering wheel is not gripped by the driver, in a case where the determined state is the hands-off state.

The controller of the gripping state detection device according to the second aspect is configured to determine that the first steering state has occurred when the controller determines that the electrostatic capacitance is equal to or greater than a first threshold electrostatic capacitance in a case where the controller determines that the hands-off state has occurred. The controller of the gripping state detection device according to the second aspect is configured to determine that the second steering state has occurred when the controller determines that an amount of increase in the electrostatic capacitance with respect to the electrostatic capacitance at a time when the controller determines the first steering state is equal to or greater than a threshold change amount in a case where the controller determines that the first steering state has occurred. The controller of the gripping state detection device according to the second aspect is configured to determine that the hands-off state has occurred when the controller determines that an electrostatic capacitance differential value, which is an amount of change per unit elapsed time of the electrostatic capacitance, is equal to or less than a first threshold electrostatic capacitance differential value in a case where the controller determines that the second steering state has occurred.

According to the second aspect, in a case where the "first steering state" is determined, the controller determines whether or not the amount of increase in the electrostatic capacitance with respect to the electrostatic capacitance at the time when the first steering state is determined is equal to or greater than the threshold change amount. In a case where the amount of increase in the electrostatic capacitance is equal to or greater than the threshold change amount, even if the electrostatic capacitance decreases due to the driver releasing the steering wheel, a possibility that the electrostatic capacitance will not fall below the first threshold electrostatic capacitance is high. Therefore, in the determination based on the first threshold electrostatic capacitance, a transition from the "state in which the steering wheel is gripped by the driver" to the "state in which the steering wheel is not gripped by the driver" cannot be precisely determined.

Therefore, in the gripping state detection device according to the second aspect, in a case where the controller determines that the "first steering state" has occurred, when the controller determines that the amount of increase in the electrostatic capacitance is equal to or greater than the threshold change amount, the controller determines that the "second steering state" has occurred before the occurrence of a situation where the controller can clearly determine that the driver tries to release his or her hand from the steering wheel (that is, a situation where the electrostatic capacitance differential value that is the amount of change per unit elapsed time of the electrostatic capacitance is equal to or less than the first threshold electrostatic capacitance differential value). The second steering state is a state in which the steering wheel is gripped by the driver, and is a state in which the driver does not even try to release the steering wheel. That is, the "second steering state" is a state in which it is certain that the steering wheel is gripped by the driver.

In a case where the controller determines that the "second steering state" has occurred, when a situation where the controller can clearly determine that the driver tries to release his or her hand from the steering wheel (situation where the electrostatic capacitance differential value is equal to or less than the first threshold electrostatic capacitance differential value) occurs, it is not certain that the steering wheel is gripped by the driver. That is, a possibility that the steering wheel is not gripped by the driver is high. In this case, the controller determines that the "hands-off state" has occurred.

In the gripping state detection device according to the second aspect, in a case where the controller determines that the "first steering state" or the "second steering state", which is a state in which it is certain that the steering wheel is gripped by the driver, has occurred, the first determination result indicating that the steering wheel is gripped by the driver is output. Therefore, a possibility that the second determination result indicating that the steering wheel is not gripped by the driver will be output even though a transition from the "state in which the steering wheel is gripped by the driver" to the "state in which the steering wheel is not gripped by the driver" does not occur can be reduced. As a result, for example, in a case where the gripping state detection device according to the second aspect is used in a system for calling driver's attention based on the second determination result, a possibility that the warning will be needlessly issued can be reduced.

In the gripping state detection device according to the second aspect, in a case where the controller determines that the "hands-off state", which is a "state in which it is certain that the steering wheel is not gripped by the driver or a state in which a possibility that the steering wheel is not gripped by the driver is high", has occurred, the second determination result is output. Therefore, a possibility that the second determination result will not be output even though a transition from the "state in which the steering wheel is gripped by the driver" to the "state in which the steering wheel is not gripped by the driver" occurs can be reduced. As a result, for example, in a case where the gripping state detection device according to the second aspect is used in a system for calling driver's attention based on the second determination result, a possibility that the warning will not be issued when the warning is needed can be reduced.

In the first aspect and the second aspect, in a case where the controller determines that the first steering state has occurred, the controller may be configured to determine that the hands-off state has occurred at least either when the controller determines that the electrostatic capacitance is smaller than the first threshold electrostatic capacitance or when the controller determines that the electrostatic capacitance differential value is equal to or less than a second threshold electrostatic capacitance differential value, which is a value smaller than the first threshold electrostatic capacitance differential value.

According to the above, a possibility that the gripping state of the driver with respect to the steering wheel will be erroneously determined in a period other than the above period can be reduced when the gripping state of the driver with respect to the steering wheel has been changed, in the case where the controller determines that the first steering state has occurred.

In the first aspect, the controller may be configured to determine that the electrostatic capacitance measuring unit is in a detection invalid state and output the second determination result in a case where the controller determines that a period in which the second steering state is determined is equal to or longer than a predetermined time.

In the state where the controller determines the "second steering state", the occurrence of a case where the sensor differential value does not become equal to or less than the first threshold electrostatic capacitance differential value over a long period of time (for example, one hour) is very rare. In such a case, therefore, it is considered that the electrostatic capacitance sensor does not correctly detect the electrostatic capacitance for some reason. Accordingly, continuing to determine that the second steering state has occurred in such a case is not appropriate.

According to the above, continuing to be determined that the hands-off state has not occurred (the second steering state has occurred), because the electrostatic capacitance measuring unit is in the detection invalid state, can be avoided.

A third aspect of the disclosure relates to a gripping state detection device including: an electrostatic capacitance configured to measure an electrostatic capacitance that changes according to a gripping state of a driver with respect to a steering wheel of a vehicle; a temperature detector that detects a temperature of the steering wheel; and a controller configured to determine which of a steering state that is a state in which it is certain that the steering wheel is gripped by the driver, a hands-off state that is a state in which it is certain that the steering wheel is not gripped by the driver, and a detection invalid state that is a state in which whether or not the steering wheel is gripped by the driver is unable to be specified has occurred based on the electrostatic capacitance and output a first determination result, which indicates that the steering wheel is gripped by the driver, in a case where the determined state is the steering state and, output a second determination result, which indicates that the steering wheel is not gripped by the driver, in a case where the determined state is the hands-off state or the detection invalid state.

The controller of the gripping state detection device according to the third aspect is configured to determine that the steering state has occurred when the controller determines that the electrostatic capacitance is equal to or greater than a first threshold electrostatic capacitance in a case where the controller determines that the hands-off state has occurred. The controller of the gripping state detection device according to the third aspect is configured to determine that the detection invalid state has occurred when the controller determines that the electrostatic capacitance is smaller than a second threshold electrostatic capacitance, which increases as the temperature increases, in a case where the controller determines that the steering state has occurred.

In this case, during a period in which whether or not the steering wheel is gripped by the driver cannot be specified (in a case where the electrostatic capacitance is smaller than the second threshold electrostatic capacitance), the controller determines that the "detection invalid state" has occurred. In a case where the "detection invalid state" is determined, the second determination result is output.

Therefore, a possibility that the gripping state of the driver with respect to the steering wheel will be erroneously determined in a period other than the above period (determined as a detection invalid state) can be avoided. During the period, a possibility that the second determination result will not be output despite the "state in which the steering wheel is not gripped by the driver" can be avoided.

A fourth aspect of the disclosure relates to a gripping state detection device including: an electrostatic capacitance measuring unit that measures an electrostatic capacitance changing according to a gripping state of a driver with respect to a steering wheel of a vehicle; and a controller configured to determine which of a steering state that is a state in which it is certain that the steering wheel is gripped by the driver, a hands-off state that is a state in which it is certain that the steering wheel is not gripped by the driver, and a detection invalid state that is a state in which whether or not the steering wheel is gripped by the driver is unable to be specified has occurred based on the electrostatic capacitance and to output a first determination result, which indicates that the steering wheel is gripped by the driver, in a case where the determined state is the steering state and to output a second determination result, which indicates that the steering wheel is not gripped by the driver, in a case where the determined state is the hands-off state or the detection invalid state.

The controller of the gripping state detection device according to the fourth aspect determines that the steering state has occurred when the controller determines that the electrostatic capacitance is equal to or greater than a first threshold electrostatic capacitance in a case where the controller determines that the hands-off state has occurred. Incidentally, when the amount of increase in the electrostatic capacitance with respect to the electrostatic capacitance at the time when the controller determines the steering state is equal to or greater than the threshold change amount in a case where the controller determines that the steering state has occurred as described above, even if the driver releases his or her hand from the steering wheel, the electrostatic capacitance may not change to less than the first threshold electrostatic capacitance in a case where an increase in the electrostatic capacitance occurs due to an increase in the temperature of the steering wheel. Therefore, the controller of the gripping state detection device according to the fourth aspect is configured to determine that the detection invalid state has occurred when the controller determines that an amount of increase in the electrostatic capacitance with respect to the electrostatic capacitance at a time when the controller determines the steering state is equal to or greater than a threshold change amount in a case where the controller determines that the steering state has occurred.

With the gripping state detection device according to the fourth aspect, during a period in which whether or not the steering wheel is gripped by the driver cannot be specified (in a case where the amount of increase in the electrostatic capacitance is equal to or greater than the threshold change amount), the controller determines that the "detection invalid state" has occurred. In a case where the "detection invalid state" is determined, the second determination result is output.

Therefore, a possibility that the gripping state of the driver with respect to the steering wheel will be erroneously determined in a period other than the above period (determined as a detection invalid state) can be reduced. During the period, a possibility that the second determination result will not be output despite the "state in which the steering wheel is not gripped by the driver" can be avoided.

In the above description, in order to facilitate the understanding of the disclosure, names and/or reference numerals used in embodiments to be described later are added in parentheses to the configuration of the disclosure corresponding to the embodiments. However, each component of the disclosure is not limited to the embodiments defined by the above-described reference numerals. Other objects, features, and advantages of the disclosure will be easily understood from the description of embodiments of the disclosure described with reference to the following diagrams.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 10 is a flowchart showing the first steering state determination routine executed by the CPU of the steering state determination ECU;

FIG. 11 is a flowchart showing the hands-off state and sensor invalid state determination routine executed by the CPU of the steering state determination ECU;

DETAILED DESCRIPTION OF EMBODIMENTS

Figure 1A:
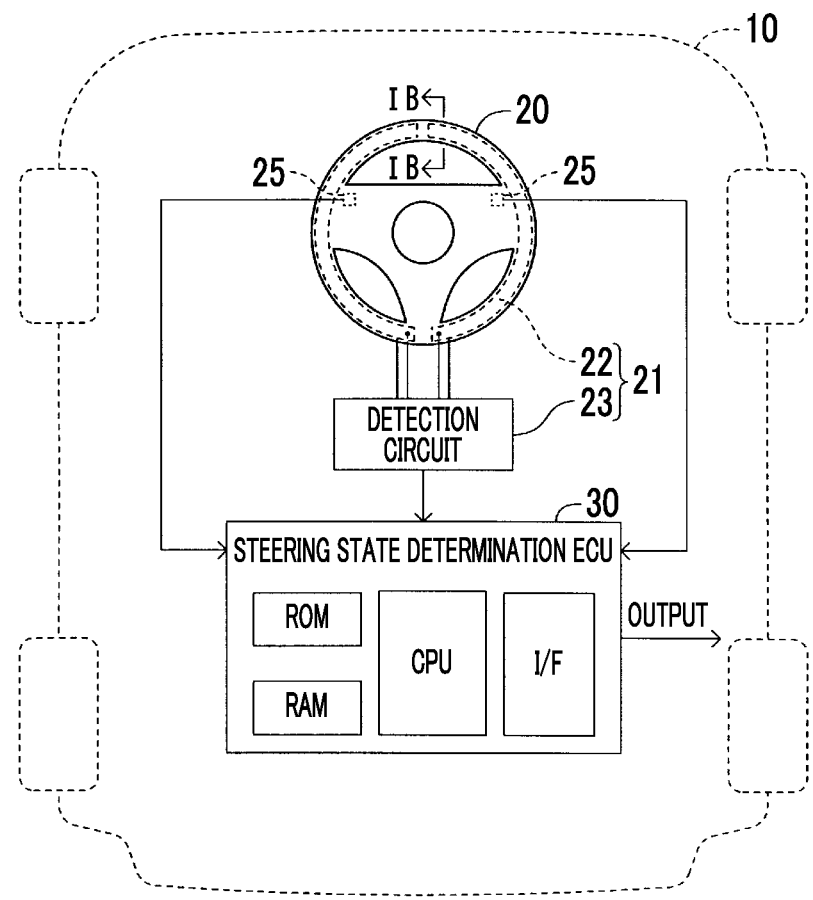
FIG. 1A is a schematic configuration diagram of a gripping state detection device according to a first embodiment of the disclosure.

Hereinafter, a gripping state detection device according to each embodiment of the disclosure will be described with reference to the diagrams. In all the diagrams of the embodiments, the same or corresponding portions are denoted by the same reference numerals.

First Embodiment

Configuration

As shown in FIG. 1A, a gripping state detection device according to a first embodiment of the disclosure (hereinafter, may be referred to as a "first device") is mounted in a vehicle 10. The vehicle 10 has a known vehicle configuration other than the first device. The vehicle 10 is a vehicle having an internal combustion engine as a drive source. The vehicle 10 may include only a motor or a motor and an internal combustion engine as a drive source.

The vehicle 10 includes a steering wheel (steering unit) 20 operated by a driver. The steering wheel 20 is well known, has a circular shape when viewed from the front, and is connected to a steering mechanism (not shown). The driver can change the steering angle of the steerable wheels by rotating the steering wheel 20.

Figure 1B:
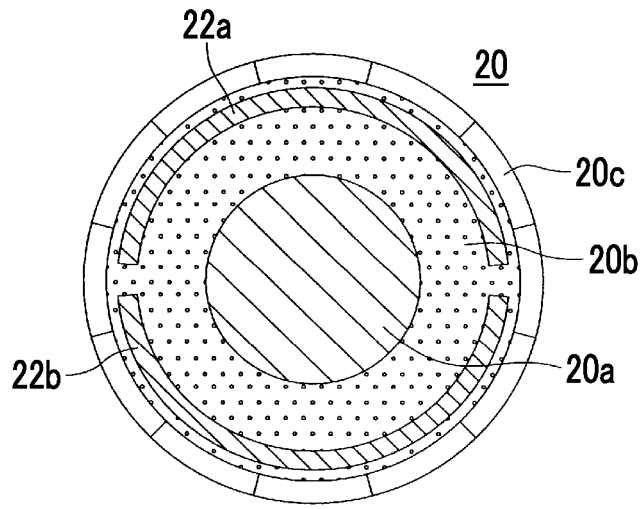
FIG. 1B is a schematic sectional view taken along the line IB-IB in FIG. 1A.

As shown in FIG. 1B that is a sectional view of the steering wheel 20, the steering wheel 20 has a structure in which a core portion 20a, an insulating portion (dielectric portion) 20b, an electrode 22a or an electrode 22b (electrostatic capacitance detection portion 22), the insulating portion 20b, and a cover portion 20c are disposed in this order from the center toward the outside.

The first device includes an electrostatic capacitance sensor 21, a temperature sensor 25, and a steering state determination electronic control unit (ECU) 30. The ECU is an electronic control circuit having a microcomputer, which includes a CPU, a ROM, a RAM, and an interface, as a main component. The CPU implements a predetermined function by executing instructions (routines) stored in a memory (ROM). Electric power is supplied to the CPU when an ignition key switch (not shown) is changed from the OFF position to the ON position.

The electrostatic capacitance sensor 21 (electrostatic capacitance measuring unit) includes the electrostatic capacitance detection portion 22 and a known electrostatic capacitance detection circuit 23 (refer to, for example, Japanese Unexamined Patent Application Publication No. 2014-153895 (JP 2014-153895 A)).

As shown in FIG. 1B, the electrostatic capacitance detection portion 22 includes a pair of electrodes 22a, 22b. The electrostatic capacitance detection circuit 23 is connected to each of the pair of electrodes 22a, 22b that forms the electrostatic capacitance detection portion 22.

The electrostatic capacitance detection circuit 23 detects an electrostatic capacitance by totaling a stray capacitance between each of the pair of electrodes 22a, 22b and an object that can be regarded as a ground, such as a vehicle body or a human body (hand), and the electrostatic capacitance of the electrostatic capacitance detection circuit itself. When the driver's hand (human body) comes in contact with the steering wheel 20, the electrostatic capacitance changes according to the contact area. The electrostatic capacitance detection circuit 23 detects the electrostatic capacitance (electrostatic capacitance change).

The electrostatic capacitance measured by the electrostatic capacitance sensor 21 changes according to the gripping state of the driver with respect to the steering wheel 20. Specifically, when the human body (hand) of the driver comes in contact with the steering wheel 20, the electrostatic capacitance measured by the electrostatic capacitance sensor 21 increases. When the driver's hand moves away from the steering wheel 20, the electrostatic capacitance measured by the electrostatic capacitance sensor 21 decreases. The electrostatic capacitance increases as the contact area between the steering wheel 20 and the body (hand) of the driver increases, and decreases as the area decreases. The electrostatic capacitance sensor 21 outputs a signal, which corresponds to the electrostatic capacitance (hereinafter, may be referred to as a "sensor value S") calculated by the electrostatic capacitance detection circuit 23, to the steering state determination ECU 30.

The temperature sensor 25 is provided in the steering wheel 20. The temperature sensor 25 is provided at a position where the temperature change of a steering wheel 20 can be changed. Specifically, the temperature sensor 25 is a thermistor, and outputs a signal corresponding to the detected temperature value to the steering state determination ECU 30.

The steering state determination ECU 30 acquires the sensor value S from the electrostatic capacitance sensor 21, and determines a state in which the driver is gripping the steering wheel 20 (hereinafter, may be simply referred to as a "gripping state") based on the sensor value S.

Then, the steering state determination ECU 30 outputs the determination result of the gripping state (a first determination result or a second determination result to described later) to another ECU or the like (not shown). Another ECU or the like that has acquired the determination result from the steering state determination ECU 30 performs various controls based on the determination result.

Overview of Operation

Next, an overview of the operation of the first device will be described. After the power is turned on, the steering state determination ECU 30 of the first device performs the next determination based on the electrostatic capacitance (that is, the sensor value S) that changes according to the gripping state of the driver with respect to the steering wheel 20 of the vehicle 10. That is, the steering state determination ECU 30 repeatedly determines which of the following "hands-off state", "first steering state", and "second steering state" has occurred based on the sensor value S. The "hands-off state" is a state in which it is certain that the steering wheel 20 is not gripped by the driver or a state in which a possibility that the steering wheel 20 is not gripped by the driver is high. The "first steering state" is a state in which it is certain that the steering wheel 20 is gripped by the driver. The "second steering state" is a state transitioning from the first steering state, and is a state in which it is certain that the steering wheel 20 is gripped by the driver.

In a case where the steering state determination result is the "first steering state" or the "second steering state", the steering state determination ECU 30 outputs a determination result indicating that the steering wheel 20 is gripped by the driver (hereinafter, referred to as a "first determination result (steering state determination result)". In a case where the steering state determination result is the "hands-off state", the steering state determination ECU 30 outputs a determination result indicating that the steering wheel 20 is not gripped by the driver (hereinafter, referred to as a "second determination result (hands-off state determination result)".

The determination result is output to another ECU (not shown) or the like from the steering state determination ECU 30. Another ECU or the like that has received the determination result performs predetermined processing based on the determination result. Specifically, the predetermined processing includes a warning, such as a hands-off warning (specifically, processing, such as the generation of warning sound) to the driver that is issued by another ECU in response to the reception of the second determination result (hands-off state determination result).

Figure 2A:
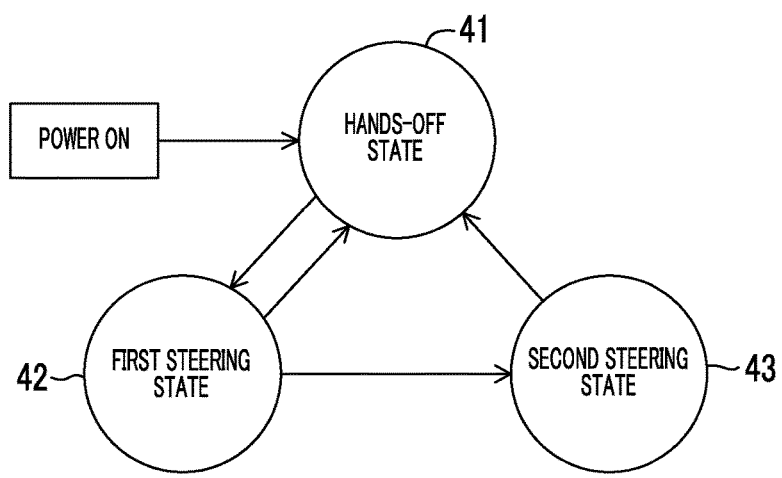
FIG. 2A is a state transition diagram for describing the operation of a steering state determination ECU.

A state 41 shown in FIG. 2A is the state of the steering state determination ECU 30 when the steering state determination ECU 30 determines that the "hands-off state" has occurred in the steering wheel 20. A state 42 is the state of the steering state determination ECU 30 when the steering state determination ECU 30 determines that the "first steering state" has occurred in the steering wheel 20. A state 43 is the state of the steering state determination ECU 30 when the steering state determination ECU 30 determines that the "second steering state" has occurred in the steering wheel 20. The state 41, the state 42, and the state 43 of the steering state determination ECU 30 make a transition as indicated by arrows based on the sensor value S.

Figure 2B:
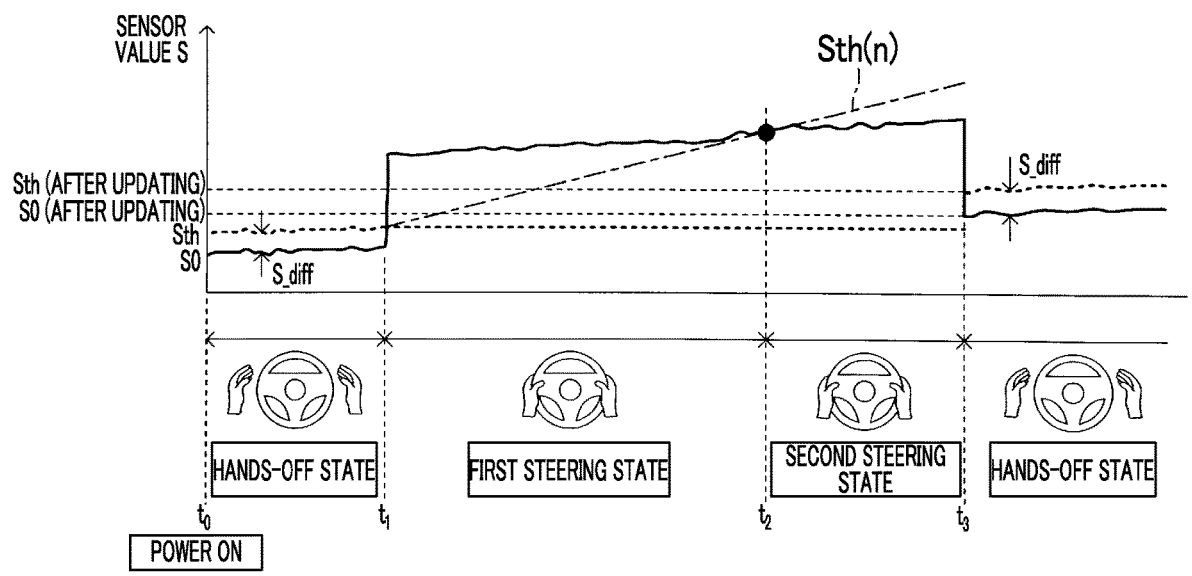
FIG. 2B is a time chart for describing the operation of the steering state determination ECU.

Specifically, in an example shown in FIG. 2B, the steering wheel 20 is not gripped by the driver immediately after the time when the power is turned on (time $t_0$ in FIG. 2B). Therefore, the steering state determination ECU 30 determines that the "hands-off state" has occurred. In the case of the state 41 of the steering state determination ECU 30 that determines that the "hands-off state" has occurred as described above, the steering state determination ECU 30 stores the current sensor value S in the RAM of the steering state determination ECU 30 as a reference sensor value S0.

Then, the steering state determination ECU 30 determines whether or not the electrostatic capacitance (sensor value S) output from the electrostatic capacitance sensor 21 is equal to or greater than a threshold electrostatic capacitance Sth (hereinafter, referred to as a "threshold value Sth"). As the threshold value Sth, a value obtained by adding a threshold change amount S_diff to the reference sensor value S0 is set. The threshold value Sth is also referred to as a "first threshold electrostatic capacitance" for the sake of convenience.

As the threshold change amount S_diff, an appropriate value is set in order to determine that a transition from the "hands-off state" to the "first steering state" has occurred. Specifically, as the threshold change amount S_diff, a value corresponding to the amount of change in the sensor value S, which occurs when a state in which the steering wheel 20 is not gripped by the driver changes to a state in which at least two fingers of the driver come in contact with the steering wheel 20, is set.

The period from time $t_0$ to the time immediately before time $t_1$ in FIG. 2B is a period in which the sensor value S is smaller than the threshold value Sth. Therefore, during the period, the steering state determination ECU 30 determines that the "hands-off state" has occurred. At time $t_1$ in FIG. 2B, the sensor value S is equal to or greater than the threshold value Sth. Therefore, at time $t_1$, the steering state determination ECU 30 determines that the "first steering state" has occurred. That is, at time $t_1$, as shown by the arrow in FIG. 2A, the state of the steering state determination ECU 30 transitions from the state 41 in which the steering state determination result is the "hands-off state" to the state 42 in which the steering state determination result is the "first steering state".

Then, the steering state determination ECU 30 determines whether or not the sensor value S is smaller than a threshold value Sth(n) that is shown by the one-dot chain line and that is obtained by performing temperature correction for the threshold value Sth (hereinafter, referred to as a "temperature correction threshold value Sth(n)"). The temperature correction threshold value Sth(n) is a threshold value obtained by correcting the threshold value Sth so that the threshold value Sth becomes larger as the temperature becomes higher based on the temperature detected by the temperature sensor 25. The temperature correction threshold value Sth(n) is also referred to as a "second threshold electrostatic capacitance" for the sake of convenience. Details of a method of calculating the temperature correction threshold value Sth(n) will be described later.

The period from time $t_1$ to the time immediately before time $t_2$ in FIG. 2B is a period in which the sensor value S equal to or greater than the temperature correction threshold value Sth(n). Therefore, during the period, since the steering state determination ECU 30 can conclude that it is certain that the steering wheel 20 is gripped by the driver, the steering state determination ECU 30 determines that the "first steering state" has occurred in the steering wheel 20. During the period, the state of the steering state determination ECU 30 is the state 42 in which the steering state determination result is the "first steering state".

At time $t_2$ in FIG. 2B, the sensor value S becomes smaller than the temperature correction threshold value Sth(n). Therefore, at time $t_2$, the steering state determination ECU 30 determines that the "second steering state" has occurred. That is, as shown by the arrow in FIG. 2A, the state of the steering state determination ECU 30 transitions from the state 42 to the state 43 in which the steering state determination result is the "second steering state".

In a case where the state of the steering state determination ECU 30 transitions to the state 43, the steering state determination ECU 30 determines whether or not a sensor differential value D (electrostatic capacitance differential value), which is the amount of change in the sensor value S per unit elapsed time, is equal to or greater than a first threshold electrostatic capacitance differential value Dthd (hereinafter, referred to as a "first threshold value differential value Dthd"). Therefore, the steering state determination ECU 30 determines whether or not a transition from the "second steering state" to the "hands-off state" has occurred. Specifically, in a case where the sensor differential value D is equal to or less than the first threshold value differential value Dthd, the steering state determination ECU 30 determines that a transition from the "second steering state" to the "hands-off state" has occurred.

As the first threshold value differential value Dthd, the amount of reduction (negative value) of the sensor value S per unit elapsed time, which occurs when an action of the driver trying to release the steering wheel 20 occurs from the state in which the steering wheel 20 is gripped by the driver, is set. Here, the action of the driver trying to release the steering wheel 20 is, for example, an action of reducing the number of fingers gripping the steering wheel 20 from five to two. Specifically, as the first threshold value differential value Dthd, an inclination −D of a straight line portion, which shows a decrease in the sensor value S at time $t_3$, in the line showing a change in the sensor value S shown in FIG. 2B is set. The inclination −D is set as a larger negative value (negative value with a smaller absolute value) than a second threshold electrostatic capacitance differential value Dtht (hereinafter, referred to as a "second threshold value differential value Dtht").

Before a change in the sensor value S occurs such that the sensor differential value D is equal to or less than the first threshold value differential value Dthd after time $t_2$ at which transition to the state 43 has occurred, the steering state determination ECU 30 can conclude that it is certain that the steering wheel 20 is gripped by the driver. Therefore, the steering state determination ECU 30 determines that the second steering state has occurred in a period immediately before the time when a change in the sensor value S occurs such that the sensor differential value D is equal to or less than the first threshold value differential value Dthd (time $t_3$) after time $t_2$.

Incidentally, in a case where the sensor value S is equal to or greater than the temperature correction threshold value Sth(n), the steering state determination ECU 30 can conclude that it is certain that the steering wheel 20 is gripped by the driver. On the other hand, when individual differences, aging, and the like of the electrostatic capacitance sensor 21 and the temperature sensor 25 are taken into consideration, the steering state determination ECU 30 cannot determine that the steering wheel 20 is not gripped by the driver simply with the fact that the sensor value S is smaller than the temperature correction threshold value Sth(n).

The period from time $t_2$ to the time immediately before time $t_3$ in FIG. 2B is a period in which the sensor differential value D is larger than the first threshold value differential value Dthd. Therefore, during the period, the state of the steering state determination ECU 30 is the state 43 in which the steering state determination result is the "second steering state".

At time $t_3$ in FIG. 2B, the sensor differential value D becomes equal to or less than the first threshold value differential value Dthd. This means that an action of the driver trying to release the steering wheel 20 occurs from the state in which the steering wheel 20 is gripped by the driver to make a transition to a state in which it is not certain that the steering wheel 20 is gripped by the driver (that is, a state in which a possibility that the steering wheel 20 is not gripped by the driver is high). Therefore, at time $t_3$, the steering state determination ECU 30 determines that the "hands-off state" has occurred. That is, as shown by the arrow in FIG. 2A, the state of the steering state determination ECU 30 transitions from the state 43 in which the steering state determination result is the "second steering state" to the state 41 in which the steering state determination result is the "hands-off state".

At this time, the steering state determination ECU 30 updates the reference sensor value S0 recorded in the RAM to the sensor value S at the time of determination. Then, a value obtained by adding the threshold change amount S_diff to the updated reference sensor value S0 is set as the updated threshold value Sth.

Although not shown, in a case where a transition from the "first steering state" to the "hands-off state" occurs in a period from time $t_1$ to the time immediately before time $t_2$, the steering state determination ECU 30 determines that the "hands-off state" has occurred. Specifically, in at least one of a case where the sensor value S becomes smaller than the threshold value Sth and a case where the sensor differential value D, which is the amount of change in the sensor value S per unit elapsed time, becomes equal to or less than the second threshold value differential value Dtht, the steering state determination ECU 30 can conclude that it is certain that the steering wheel 20 is not gripped by the driver. In this case, therefore, the steering state determination ECU 30 determines that the "hands-off state" has occurred. That is, as shown by the arrow in FIG. 2A, the state of the steering state determination ECU 30 transitions from the state 42 to the state 41 in which the steering state determination result is the "hands-off state".

As the second threshold value differential value Dtht, an appropriate negative value is set in order to determine that a transition from the state in which the steering wheel 20 is gripped by the driver to the state in which the steering wheel 20 is not gripped by the driver has occurred. As the second threshold value differential value Dtht, a smaller negative value (negative value with a larger absolute value) than the first threshold value differential value Dthd is set.

Specific Operation

Next, a specific operation of a CPU of the steering state determination ECU 30 (hereinafter, simply referred to as a "CPU") will be described. The CPU executes each of the first steering state determination routine, the second steering state and hands-off state determination routine, and the hands-off state determination routine shown in the flowcharts of FIGS. 3 to 5 each time a predetermined time passes.

The CPU determines which of the "hands-off state", the "first steering state", and the "second steering state" has occurred based on the electrostatic capacitance (that is, the sensor value S) output from the electrostatic capacitance sensor 21. The CPU changes (sets) the values of a first steering state determination flag Xhda and a second steering state determination flag Xmna according to the steering state determination result.

In a case where the value of the first steering state determination flag Xhda is "1", this indicates that the CPU determines that the "first steering state" has occurred. In a case where the value of the second steering state determination flag Xmna is "1", this indicates that the CPU determines that the "second steering state" has occurred. As described above, in a case where the CPU determines the "first steering state" or the "second steering state", the CPU outputs the first determination result (steering state determination result).

In a case where both the values of the first steering state determination flag Xhda and the second steering state determination flag Xmna are "0", this indicates that the CPU determines that the "hands-off state" has occurred. In this case, the CPU outputs the second determination result (hands-off state determination result).

When an ignition key switch (not shown) mounted in the vehicle 10 is changed from the OFF position to the ON position (that is, the power of the first device is turned on), the value of the first steering state determination flag Xhda and the value of the second steering state determination flag Xmna are set to "0" in the initial routine executed by the CPU.

Figure 3:
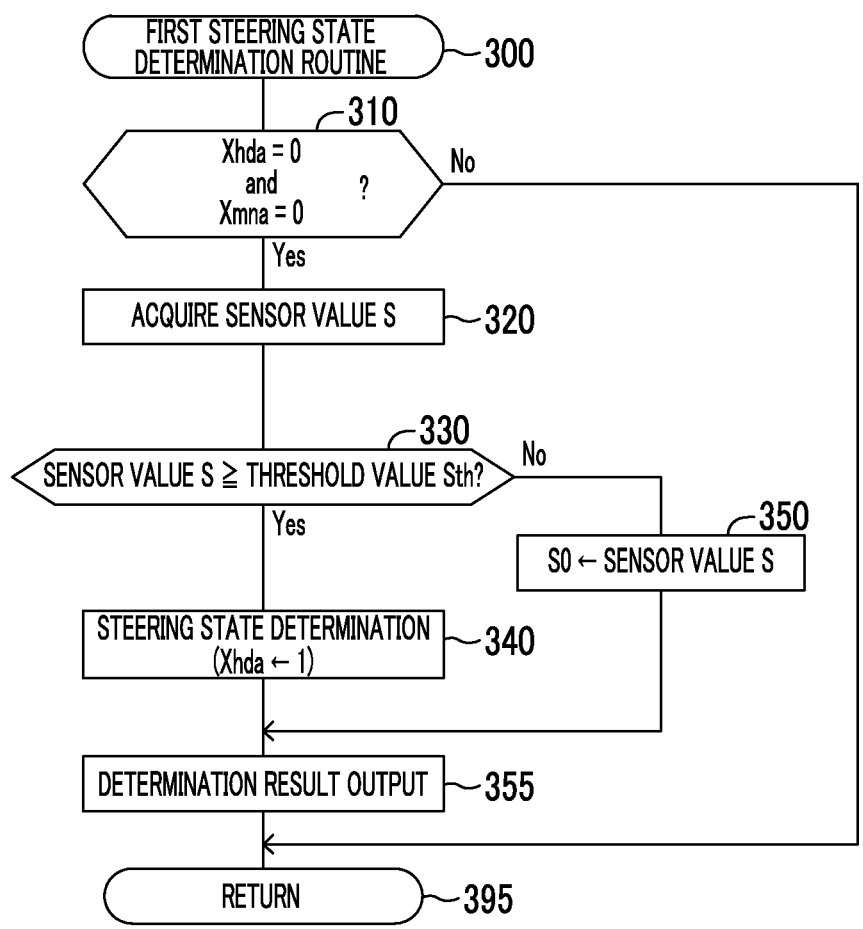
FIG. 3 is a flowchart showing the first steering state determination routine executed by the CPU of the steering state determination ECU.
Figure 4:
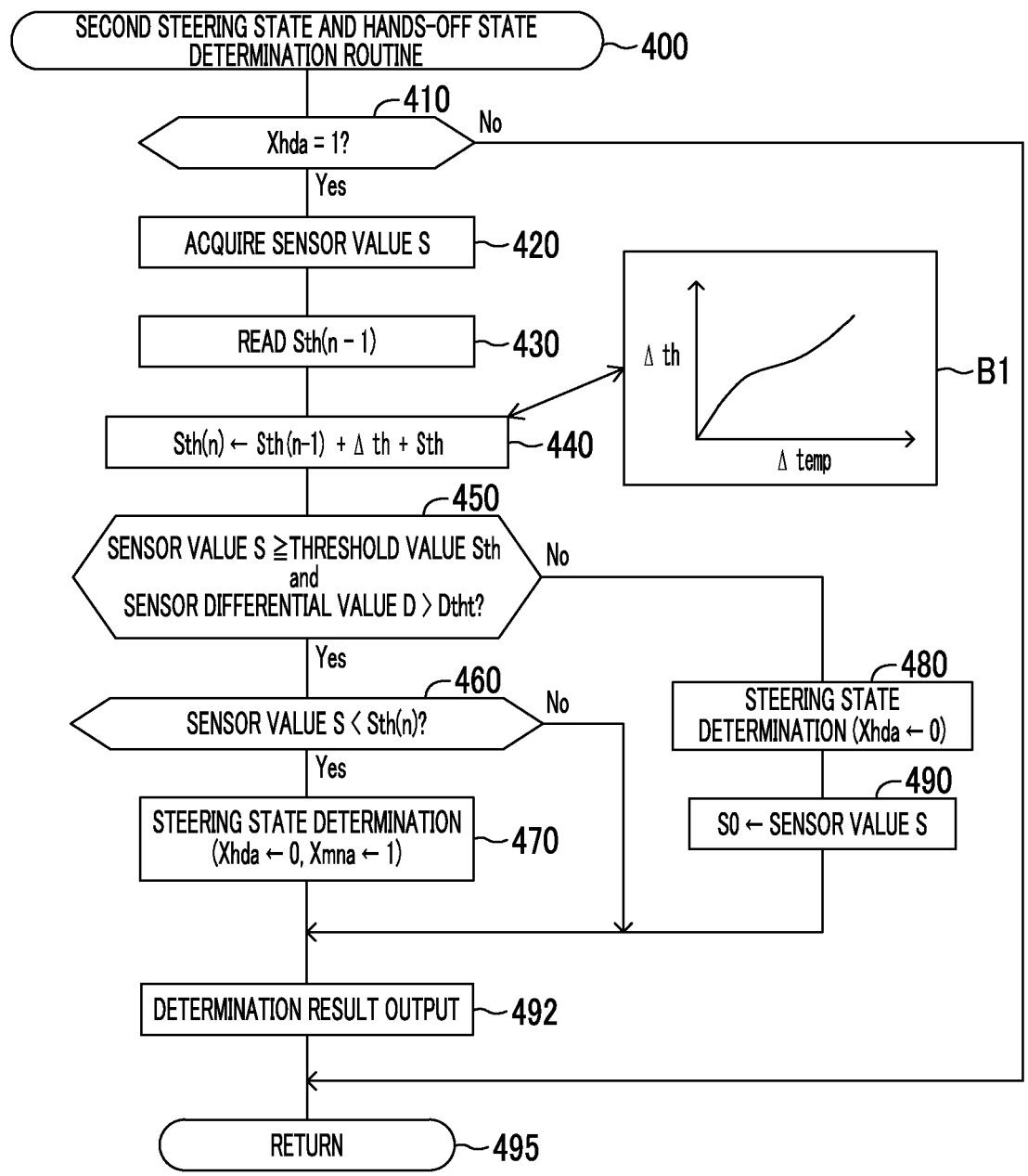
FIG. 4 is a flowchart showing the second steering state and hands-off state determination routine executed by the CPU of the steering state determination ECU.
Figure 5:
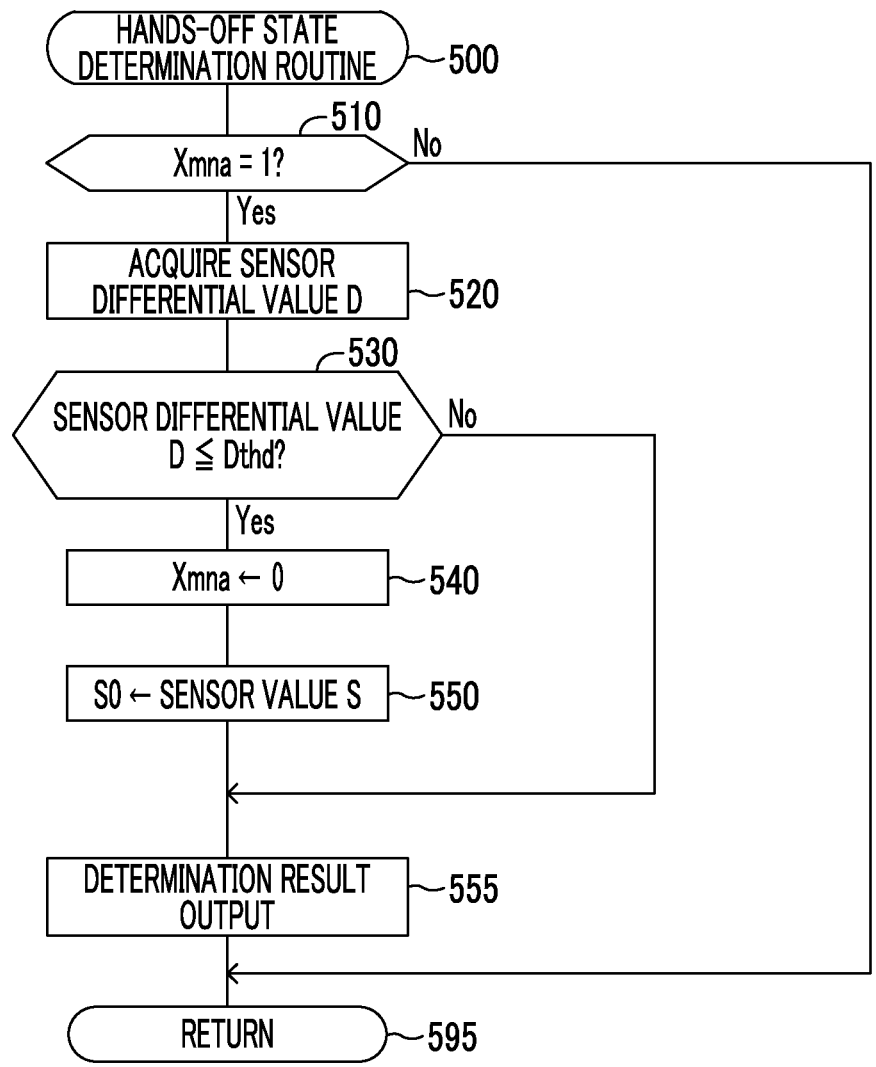
FIG. 5 is a flowchart showing the hands-off state determination routine executed by the CPU of the steering state determination ECU.

In a case where the ignition key switch is at the ON position, the routines shown in FIGS. 3 to 5 are started each time a predetermined time passes. Since the first steering state determination flag Xhda and the second steering state determination flag Xmna are initialized (Xhda=0, Xmna=0), the state of the steering state determination ECU 30 becomes the state 41 in which the current determined state is the "hands-off state". In this case, the first steering state determination routine works substantially.

Hereinafter, the first steering state determination routine will be described with reference to FIG. 3. The CPU starts processing from step 300 of the first steering state determination routine at a predetermined timing, and proceeds to step 310. In step 310, the CPU determines whether or not both the values of the first steering state determination flag Xhda and the second steering state determination flag Xmna are "0".

In a case where both the values of the first steering state determination flag Xhda and the second steering state determination flag Xmna are "0", the CPU determines "Yes" in step 310, and proceeds to step 320 to acquire the sensor value S output from the electrostatic capacitance sensor 21. Then, the CPU proceeds to step 330 to determine whether or not the sensor value S is equal to or greater than the threshold value Sth.

In a case where the sensor value S is equal to or greater than the threshold value Sth, the CPU determines "Yes" in step 330, and proceeds to step 340 to set the value of the first steering state determination flag Xhda to "1". That is, the CPU determines that the "first steering state" has occurred. Then, the CPU proceeds to step 355 to output a determination result (first determination result (steering state determination result)) according to the determined state (that is, the first steering state indicated by Xhda=1 and Xmna=0) of the CPU. Then, the CPU proceeds to step 395 to temporarily end the routine.

On the other hand, in a case where the sensor value S is smaller than the threshold value Sth, the CPU determines "No" in step 330, and proceeds to step 350 to update the reference sensor value S0 to the sensor value S. The CPU also updates the value of the threshold value Sth to a value (=S0+S_diff) obtained by adding the threshold change amount S_diff to the updated reference sensor value S0. The processing of step 350 may be performed every time the routine is executed a predetermined number of times. Then, the CPU proceeds to step 355 to output a determination result (second determination result (hands-off state determination result)) according to the determined state (that is, the hands-off state indicated by Xhda=0 and Xmna=0) of the CPU. Then, the CPU proceeds to step 395 to temporarily end the routine.

In a case where at least one of the values of the first steering state determination flag Xhda and the second steering state determination flag Xmna is not "0" at the time when the CPU executes the processing of step 310, the CPU determines "No" in step 310, and proceeds to step 395 to temporarily end the routine.

Next, the second steering state and hands-off state determination routine will be described with reference to FIG. 4. The CPU starts processing from step 400 in FIG. 4 at a predetermined timing, and proceeds to step 410. In step 410, the CPU determines whether or not the value of the first steering state determination flag Xhda is "1".

The second steering state and hands-off state determination routine works substantially in the case of the state 43 in which the determined state of the CPU is a "steering state" (that is, in a case where the value of the first steering state determination flag Xhda is set to "1"). Therefore, in a case where the value of the first steering state determination flag Xhda is not "1", the CPU determines "No" in step 410, and proceeds to step 495 to temporarily end the routine.

On the other hand, in a case where the value of the first steering state determination flag Xhda is "1", the CPU determines "Yes" in step 410, and proceeds to step 420 to acquire the sensor value S output from the electrostatic capacitance sensor 21.

Then, the CPU proceeds to step 430 to read a temperature correction threshold value Sth(n−1) (hereinafter, referred to as a "last temperature correction threshold value Sth(n−1)") of a routine one cycle before the routine from the RAM. Then, the CPU proceeds to step 440 to calculate the temperature correction threshold value Sth(n) used in the routine by applying the last temperature correction threshold value Sth(n−1), a temperature gradient coefficient $\Delta$th, and the threshold value Sth to (Equation) Sth(n)=Sth(n−1)+$\Delta$th+Sth. n is an integer of one or more, and Sth(0) is zero. The calculated temperature correction threshold value Sth(n) is stored in the RAM.

The temperature gradient coefficient $\Delta$th is calculated by applying the temperature change $\Delta$temp per unit elapsed time of the temperature acquired from the temperature sensor 25 to a look-up table Map$\Delta$th ($\Delta$temp) shown in a block B1 of FIG. 4. According to the look-up table Map$\Delta$th ($\Delta$temp), the temperature gradient coefficient $\Delta$th increases as the temperature change $\Delta$temp increases. That is, since the sensor value S becomes larger as the temperature of the steering wheel 20 becomes higher, the CPU corrects the threshold value Sth so that the threshold value Sth changes in proportion to the temperature change. In a case where the sensor value S exceeds the temperature correction threshold value Sth(n) after such correction, the CPU can conclude that it is certain that the steering wheel 20 is gripped by the driver. In this case, therefore, the CPU determines that the "first steering state" has occurred in the steering wheel 20 as will be described later.

In a case where the determined state of the CPU is the "first steering state", when the sensor value S is less than the temperature correction threshold value Sth(n), the CPU determines that the "second steering state" has occurred as will be described later. A period before a change in the sensor value S when the driver tries to release the steering wheel 20 occurs after the determination can be said to be a period in which even an action of the driver trying to release the steering wheel 20 does not occur. During the period, the CPU can conclude that it is certain that the steering wheel 20 is gripped by the driver. Therefore, as will be described later, the CPU determines that the "second steering state" has occurred in the period.

The CPU proceeds to step 450 to determine whether the sensor value S is equal to or greater than the threshold value Sth and the sensor differential value D is larger than the second threshold value differential value Dtht. In a case where the sensor value S is equal to or greater than the threshold value Sth and the sensor differential value D is larger than the second threshold value differential value Dtht, the CPU determines "Yes" in step 450, and proceeds to step 460 to determine whether or not the sensor value S is smaller than the temperature correction threshold value Sth(n).

In a case where the sensor value S is smaller than the temperature correction threshold value Sth(n), the CPU determines "Yes" in step 460, and proceeds to step 470 to set the value of the first steering state determination flag Xhda to "0" and set the value of the second steering state determination flag Xmna to "1". That is, the CPU determines that the "second steering state" has occurred. Then, the CPU proceeds to step 492 to output a determination result (first determination result (steering state determination result)) according to the determined state (that is, the second steering state indicated by Xhda=0 and Xmna=1) of the CPU. Then, the CPU proceeds to step 495 to temporarily end the routine.

On the other hand, in a case where the sensor value S is equal to or greater than the temperature correction threshold value Sth(n), the CPU determines "No" in step 460. In this case, the value of the first steering state determination flag Xhda is still "1". That is, the CPU determines that the "first steering state" has occurred. Then, the CPU proceeds to step 492 to output a determination result (first determination result (steering state determination result)) according to the determined state (that is, the first steering state indicated by Xhda=1 and Xmna=0) of the CPU. Then, the CPU proceeds to step 495 to temporarily end the routine.

In at least one of a case where the sensor value S is smaller than the threshold value Sth and a case where the sensor differential value D is equal to or less than the second threshold value differential value Dtht at the time when the CPU executes the processing of step 450, the CPU determines "No" in step 450. Then, the CPU proceeds to step 480 to set the value of the first steering state determination flag Xhda to "0". That is, the CPU determines that the "hands-off state" has occurred. Then, the CPU proceeds to step 490 to update the reference sensor value S0 to the sensor value S. Then, the CPU proceeds to step 492 to output a determination result (second determination result (hands-off state determination result)) according to the determined state (that is, the hands-off state indicated by Xhda=0 and Xmna=0) of the CPU. Then, the CPU proceeds to step 495 to temporarily end the routine.

Next, the hands-off state determination routine will be described with reference to FIG. 5. The CPU starts processing from step 500 in FIG. 5 at a predetermined timing, and proceeds to step 510. In step 510, the CPU determines whether or not the value of the second steering state determination flag Xmna is "1".

The hands-off state determination routine works substantially in the case of the state 43 in which the determined state of the CPU is the "second steering state" (that is, in a case where the value of the second steering state determination flag Xmna is set to "1"). Therefore, in a case where the value of the second steering state determination flag Xmna is "0" (that is, in a case where the determined state of the CPU is not the "second steering state"), the CPU determines "No" in step 510, and proceeds to step 595 to temporarily end the routine.

On the other hand, in a case where the value of the second steering state determination flag Xmna is "1", the CPU determines "Yes" in step 510, and proceeds to step 520 to acquire the sensor differential value D that is the amount of change per unit elapsed time of the sensor value S output from the electrostatic capacitance sensor 21.

Then, the CPU proceeds to step 530 to determine whether or not the sensor differential value D is equal to or less than the first threshold value differential value Dthd.

In a case where the sensor differential value D is equal to or less than the first threshold value differential value Dthd, the CPU determines "Yes" in step 530, and proceeds to step 540 to set the value of the second steering state determination flag Xmna to "0". At this time, the value of the first steering state determination flag Xhda is "0". That is, the CPU determines that the "hands-off state" has occurred.

Then, the CPU proceeds to step 550 to update the reference sensor value S0 recorded in the RAM to the sensor value S at the time when the CPU determines the "hands-off state". Then, a value (=S0+S_diff) obtained by adding the threshold change amount S_diff to the updated reference sensor value S0 is set as the updated threshold value Sth.

Then, the CPU proceeds to step 555 to output a determination result (second determination result (hands-off state determination result)) according to the determined state (that is, the hands-off state indicated by Xhda=0 and Xmna=0) of the CPU. Then, the CPU proceeds to step 595 to temporarily end the routine.

On the other hand, in a case where the sensor differential value D is a value larger than the first threshold value differential value Dthd, the CPU determines "No" in step 530. In this case, the value of the second steering state determination flag Xmna is still "1" (that is, the CPU determines that the second steering state has occurred). Then, the CPU proceeds to step 555 to output a determination result (first determination result (steering state determination result)) according to the determined state (that is, the second steering state indicated by Xhda=0 and Xmna=1) of the CPU. Then, the CPU proceeds to step 595 to temporarily end the routine.

As described above, according to the first device, in a case where the CPU determines the "hands-off state", when the CPU determines that the sensor value S is equal to or greater than the threshold value Sth (first threshold electrostatic capacitance), the CPU determines that the "first steering state" has occurred. In a case where the CPU determines the "first steering state", the CPU determines whether or not the sensor value S is a value smaller than the temperature correction threshold value Sth(n) (second threshold electrostatic capacitance). Even in a case where the sensor value S increases due to a rise in the temperature of the steering wheel 20, if the sensor value S is equal to or greater than the temperature correction threshold value Sth(n), the temperature correction threshold value Sth(n) is set to a value by which the CPU can determine that the driver is surely gripping the steering wheel 20.

On the other hand, a transition from the "state in which the steering wheel 20 is gripped by the driver" to the "state in which the steering wheel 20 is not gripped by the driver" cannot be concluded simply with the fact that the sensor value S has become smaller than the temperature correction threshold value Sth(n). For example, in a case where the CPU determines the "first steering state", if the temperature of the steering wheel 20 further increases in a situation where the gripping state of the steering wheel 20 does not change, the sensor value S may become smaller than the temperature correction threshold value Sth(n) according to an increase in the temperature correction threshold value Sth(n). For this reason, even if the sensor value S becomes less than the temperature correction threshold value Sth(n) in a case where the CPU determines the "first steering state", a state transition to the "state in which the steering wheel 20 is not gripped by the driver" cannot be concluded.

Therefore, in the first device, in a case where the CPU determines that the "first steering state" has occurred, when the CPU determines that the sensor value S is smaller than the temperature correction threshold value Sth(n), the CPU determines that the "second steering state" has occurred before the occurrence of a situation where the CPU can clearly determine that the driver tries to release the steering wheel 20 (that is, a situation where the sensor differential value D is equal to or less than the first threshold value differential value Dthd). The "second steering state" is a state in which the steering wheel 20 is gripped by the driver, and is a state in which the driver does not even try to release the steering wheel 20. That is, the "second steering state" is a state in which it is certain that the steering wheel 20 is gripped by the driver.

In a case where the CPU determines that the "second steering state" has occurred, when a situation where the CPU can clearly determine that the driver tries to release the steering wheel 20 (that is, a situation where the sensor differential value D is equal to or less than the first threshold value differential value Dthd) occurs, it is not certain that the steering wheel 20 is gripped by the driver. That is, a possibility that the steering wheel 20 is not gripped by the driver is high. In this case, the CPU determines that the "hands-off state" has occurred.

According to the first device, even in a case where the temperature of the steering wheel 20 changes, the state in which the steering wheel 20 is gripped by the driver can be detected more precisely.

According to the first device, in a case where the CPU determines the "first steering state" or the "second steering state", which is a state in which it is certain that the steering wheel 20 is gripped by the driver, the first determination result (steering state determination result) is output.

Therefore, a possibility that the second determination result (hands-off state determination result) will be output even though a transition from the "state in which the steering wheel 20 is gripped by the driver" to the "state in which the steering wheel 20 is not gripped by the driver" does not occur can be reduced.

As a result, for example, in a case where the first device is used in a system for calling driver's attention based on the second determination result (hands-off state determination result), a possibility that the warning will be needlessly issued can be reduced.

According to the first device, in a case where the CPU determines the "hands-off state", which is a state in which it is certain that the steering wheel 20 is not gripped by the driver or a state in which a possibility that the steering wheel 20 is not gripped by the driver is high, the second determination result (hands-off state determination result) is output.

Therefore, a possibility that the second determination result (hands-off state determination result) will not be output even though a transition from the "state in which the steering wheel 20 is gripped by the driver" to the "state in which the steering wheel 20 is not gripped by the driver" occurs can be reduced.

As a result, for example, in a case where the first device is used in a system for calling driver's attention based on the second determination result (hands-off state determination result), a possibility that the warning will not be issued when the warning is needed can be reduced.

Second Embodiment

Next, a gripping state detection device (hereinafter, may be referred to as a "second device") according to a second embodiment of the disclosure will be described. The second device is different from the first device only in the following points. (1) The second device does not include the temperature sensor 25. (2) The second device executes a first steering state determination routine shown in FIG. 7 that replaces the routine shown in FIG. 3, a second steering state and hands-off state determination routine shown in FIG. 8 that replaces the routine shown in FIG. 4, and a hands-off state determination routine that is the same as the hands-off state determination routine shown in FIG. 5. Hereinafter, the differences will be mainly described.

Overview of Operation

Figure 6:
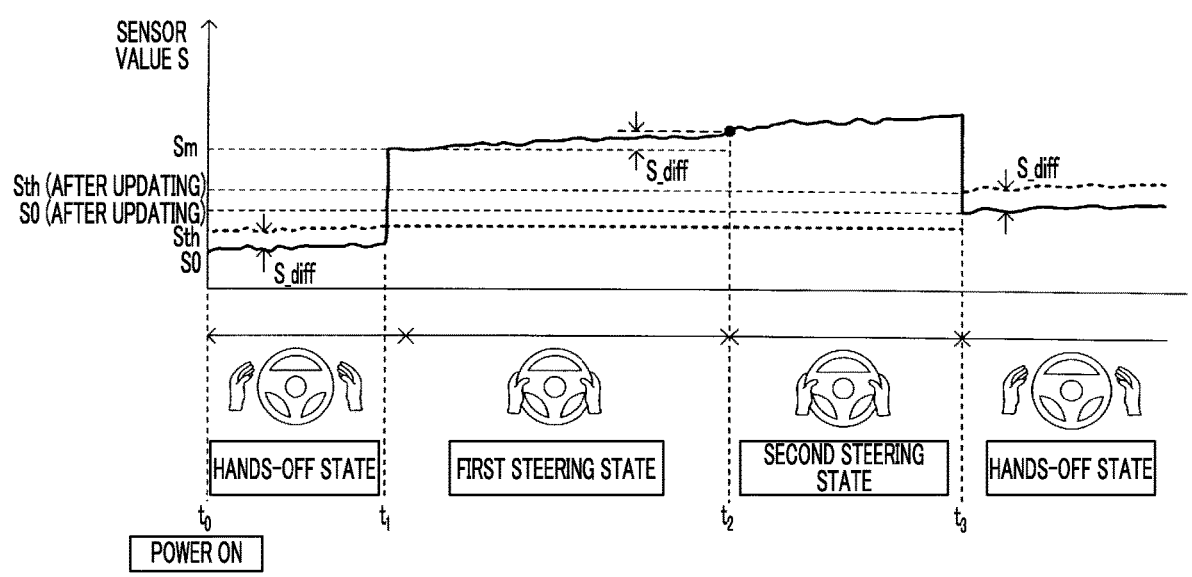
FIG. 6 is a state transition diagram for describing the operation of the steering state determination ECU.

Next, an overview of the operation of the second device will be described. As shown in FIG. 6, the steering state determination ECU 30 determines that the "hands-off state" has occurred immediately after the time when the power is turned on (time $t_0$ in FIG. 6). Then, the steering state determination ECU 30 determines whether or not the sensor value S is equal to or greater than the threshold value Sth.

The period from time $t_0$ to the time immediately before time $t_1$ in FIG. 6 is a period in which the sensor value S is smaller than the threshold value Sth. Therefore, during the period, the steering state determination ECU 30 determines that the "hands-off state" has occurred. At time $t_1$ in FIG. 6, the sensor value S is equal to or greater than the threshold value Sth. Therefore, at time $t_1$, the steering state determination ECU 30 determines that the "first steering state" has occurred.

Then, the steering state determination ECU 30 determines whether or not the value of a difference "S−Sm", which is obtained by subtracting a "sensor value Sm at time $t_1$ that is the time when the sensor differential value becomes smaller than Dth0 after the sensor value S changes from a value smaller than the threshold value Sth to a value equal to or greater than the threshold value Sth" from the "sensor value S", is equal to or greater than the threshold change amount S_diff. The value of the difference "S−Sm" indicates the amount of increase in electrostatic capacitance with respect to the electrostatic capacitance at the time when the steering state determination ECU 30 determines that the "first steering state" has occurred.

The period from time $t_1$ to the time immediately before time $t_2$ in FIG. 6 is a period in which the value of the difference "S−Sm" is smaller than the threshold change amount S_diff. Therefore, during the period, the state of the steering state determination ECU 30 is the state 42 in which the determined state is the "first steering state".

Therefore, when the value of the difference "S−Sm" becomes equal to or greater than the threshold change amount S_diff at time $t_2$ in FIG. 6, the steering state determination ECU 30 determines that the "second steering state" has occurred. That is, the steering state determination ECU 30 transitions from the state 42 to the state 43 in which the determination result is the "second steering state". Although not shown, in at least one of a case where the sensor value S becomes smaller than the threshold value Sth during a period from time $t_1$ to the time immediately before time $t_2$ and a case where the sensor differential value D becomes equal to or less than the second threshold value differential value Dtht, the steering state determination ECU 30 determines that the "hands-off state" has occurred.

The overview of the operation in the period after time $t_2$ is the same as the overview of the operation of the first device described above with reference to FIGS. 2A and 2B. That is, after time $t_2$, the steering state determination ECU 30 determines whether or not the sensor differential value D is equal to or less than the first threshold value differential value Dthd.

The period from time $t_2$ to the time immediately before time $t_3$ in FIG. 6 is a period in which the sensor differential value D is a value larger than the first threshold value differential value Dthd. Therefore, during the period, the state of the steering state determination ECU 30 is the state 43 in which the determined state is the "second steering state". Then, when the sensor differential value D becomes equal to or less than the first threshold value differential value Dthd at time $t_3$ in FIG. 6, the steering state determination ECU 30 determines that the "hands-off state" has occurred. That is, the state of the steering state determination ECU 30 transitions from the state 43 to the state 41 in which the determined state is the "hands-off state".

Specific Operation

Next, a specific operation of a CPU of the steering state determination ECU 30 (hereinafter, simply referred to as a "CPU") of the second device will be described. The CPU executes each of the first steering state determination routine shown in the flowchart of FIG. 7, the second steering state and hands-off state determination routine shown in the flowchart of FIG. 8, and the same hands-off state determination routine as that shown in the flowchart of FIG. 5 each time a predetermined time passes.

Figure 7:
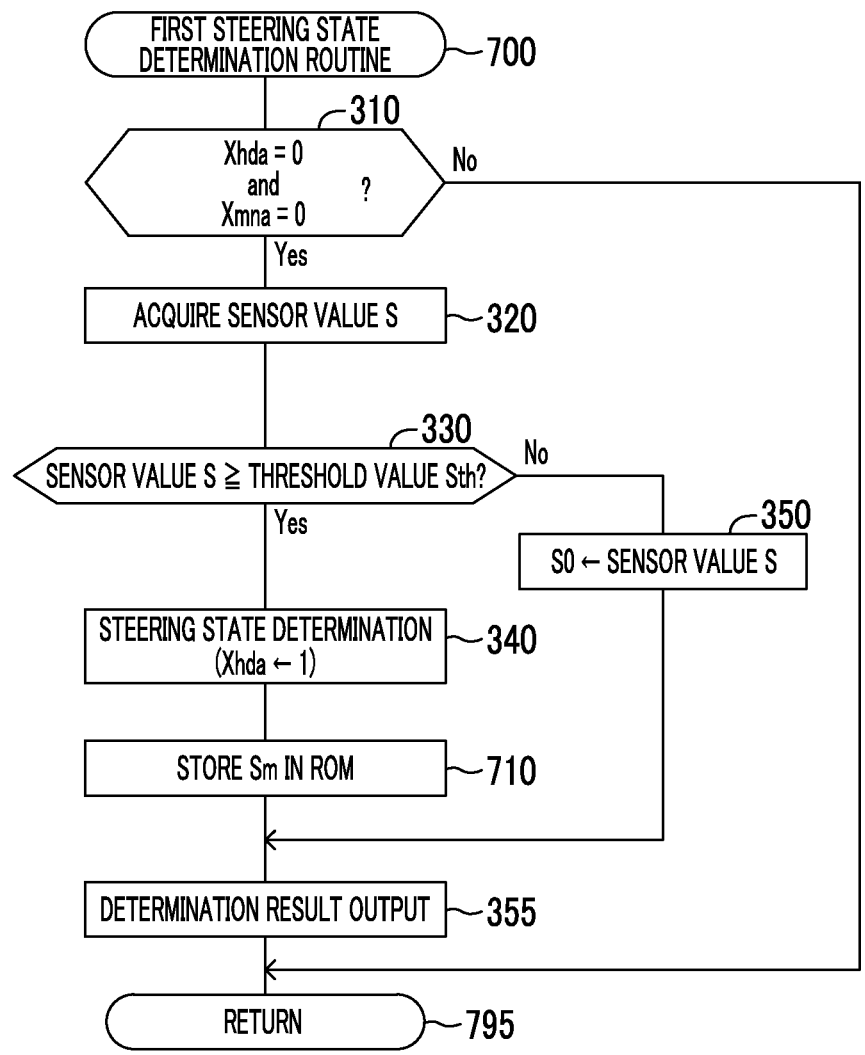
FIG. 7 is a flowchart showing the first steering state determination routine executed by the CPU of the steering state determination ECU.
Figure 8:
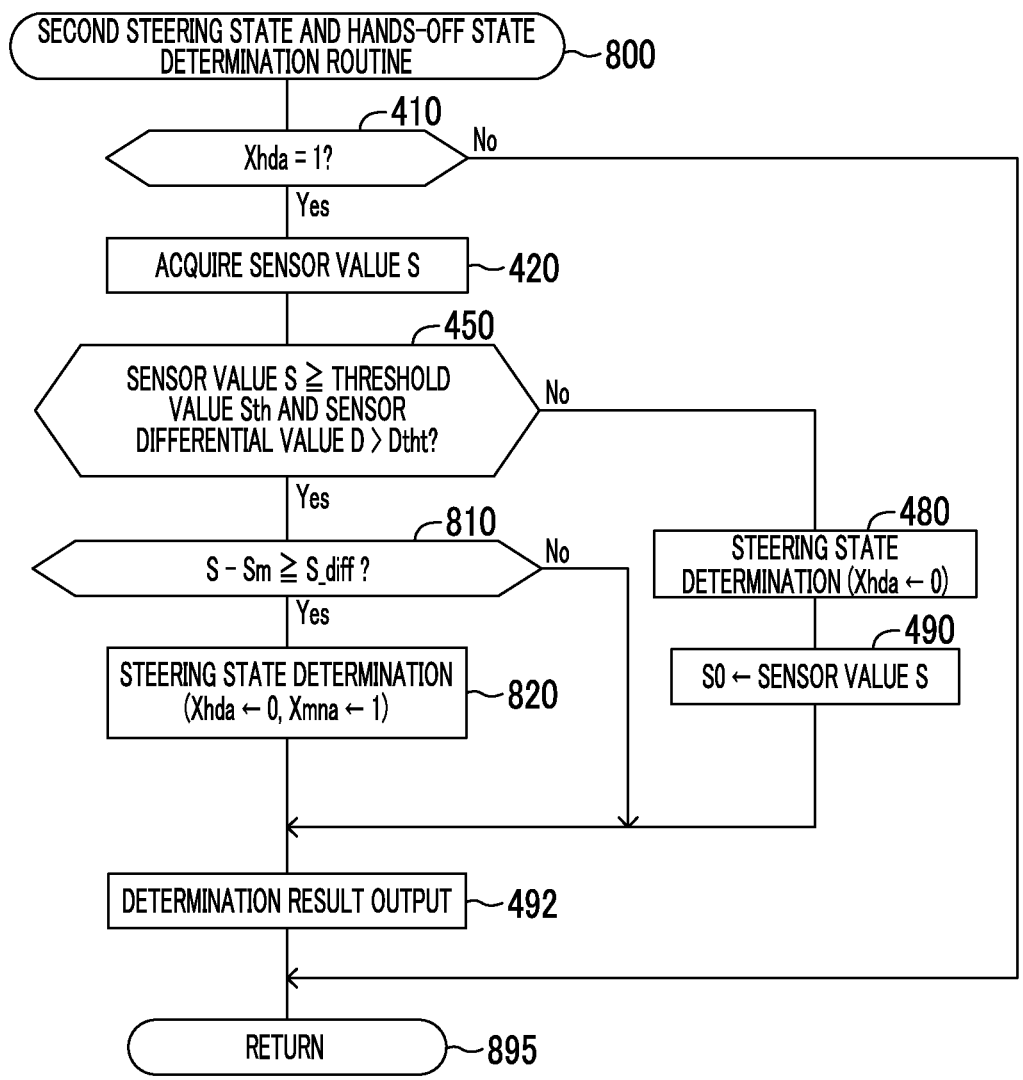
FIG. 8 is a flowchart showing the second steering state and hands-off state determination routine executed by the CPU of the steering state determination ECU.

Steps in which the same processing as in the steps already described in FIGS. 7 and 8 is performed are denoted by the same reference numerals as those assigned to the preceding diagrams, and the description of these steps will be appropriately omitted. This also applies to the description of a first modification example to a fourth embodiment to be described later.

Hereinafter, the first steering state determination routine will be described with reference to FIG. 7. The CPU starts processing from step 700 of the first steering state determination routine at a predetermined timing, and performs processing of appropriate steps among steps 310 to 350 in order.

In step 340, the CPU sets the value of the first steering state determination flag Xhda to "1". That is, the CPU determines that the "steering state" has occurred. Then, the CPU proceeds to step 710 to store the sensor value Sm at the time when the sensor differential value D becomes smaller than a threshold value Dthx in the ROM. The threshold value Dthx is the inclination of a straight line portion, which shows an abrupt increase in the sensor value S at time $t_1$, in the line showing a change in the sensor value S shown in FIG. 6. Then, the CPU executes processing of step 355, and then proceeds to step 795 to temporarily end the routine. In this case, therefore, the CPU outputs a determination result (first determination result (steering state determination result)) according to the determined state (that is, the first steering state indicated by Xhda=1 and Xmna=0) of the CPU.

Next, the second steering state and hands-off state determination routine will be described with reference to FIG. 8. The CPU starts processing from step 800 of the second steering state and hands-off state determination routine at a predetermined timing, and proceeds to step 410. In a case where the value of the first steering state determination flag Xhda is "1", the CPU performs processing of steps 420 and 450 in order. In a case where the sensor value S is equal to or greater than the threshold value Sth and the sensor differential value D is larger than the second threshold value differential value Dtht at the time of executing the processing of step 450, the CPU determines "Yes" in step 450, and proceeds to step 810 to determine whether or not the value of the difference "S−Sm" is equal to or greater than the threshold change amount S_diff.

In a case where the value of the difference "S−Sm" is equal to or greater than the threshold change amount S_diff, the CPU determines "Yes" in step 810, and proceeds to step 820 to set the value of the first steering state determination flag Xhda to "0" and set the value of the second steering state determination flag Xmna to "1". That is, the CPU determines that the "second steering state" has occurred.

In a case where the value of the difference "S−Sm" is equal to or greater than the threshold change amount S_diff, even if the sensor value S decreases due to the driver releasing the steering wheel 20, a possibility that the sensor value S will not fall below the threshold value Sth is high. That is, in this case, even if the sensor value S is equal to or greater than the threshold value Sth, a state in which the steering wheel 20 is not gripped by the driver can be considered. Therefore, whether or not the steering wheel 20 is gripped by the driver cannot be specified by comparison between the sensor value S and the threshold value Sth.

On the other hand, a period before a change in the sensor value S when the driver tries to release the steering wheel 20 occurs after the time when the value of the difference "S−Sm" becomes equal to or greater than the threshold change amount S_diff can be said to be a period in which even an action of the driver trying to release the steering wheel 20 does not occur. Therefore, during the period, the CPU can conclude that it is certain that the steering wheel 20 is gripped by the driver. Accordingly, the CPU determines that the "second steering state" has occurred during such a period. Then, the CPU executes processing of step 492, and then proceeds to step 895 to temporarily end the routine. In this case, therefore, the CPU outputs a determination result (first determination result (steering state determination result)) according to the determined state (that is, the second steering state indicated by Xhda=0 and Xmna=1) of the CPU.

On the other hand, in a case where the value of the difference "S−Sm" is smaller than the threshold change amount S_diff, the CPU determines "No" in step 810. In this case, the value of the first steering state determination flag Xhda is still "1". Then, the CPU executes processing of step 492, and then proceeds to step 895 to temporarily end the routine. In this case, therefore, the CPU outputs a determination result (first determination result (steering state determination result)) according to the determined state (that is, the first steering state indicated by Xhda=1 and Xmna=0) of the CPU.

In at least one of a case where the sensor value S is smaller than the threshold value Sth and a case where the sensor differential value D is equal to or less than the second threshold value differential value Dtht at the time when the CPU executes the processing of step 450, the CPU determines "No" in step 450. Then, the CPU executes processing of steps 480 and 490, and then executes processing of step 492. Then, the CPU proceeds to step 895 to temporarily end the routine. In this case, therefore, the CPU outputs a determination result (second determination result (hands-off state determination result)) according to the determined state (that is, the hands-off state indicated by Xhda=0 and Xmna=0) of the CPU.

As described above, the CPU performs processing of the same hands-off state determination routine as the hands-off state determination routine in FIG. 5.

As described above, according to the second device, in a case where the CPU determines the "first steering state", the CPU determines whether or not the value of the difference "S−Sm" is equal to or greater than the threshold change amount S_diff. In a case where the value of the difference "S−Sm" is equal to or greater than the threshold change amount S_diff, even if the sensor value S decreases due to hand release, a possibility that the sensor value S will not fall below the threshold value Sth (first threshold electrostatic capacitance) is high. Therefore, in the determination based on the threshold value Sth, a transition from the "state in which the steering wheel 20 is gripped by the driver" to the "state in which the steering wheel 20 is not gripped by the driver" cannot be precisely determined.

Therefore, in the second device, in a case where the CPU determines that the "first steering state" has occurred, when the CPU determines that the value of the difference "S−Sm" is equal to or greater than the threshold change amount S_diff, the CPU determines that the "second steering state" has occurred before the occurrence of a situation where the CPU can clearly determine that the driver tries to release the steering wheel 20 (that is, a situation where the sensor differential value D is equal to or less than the first threshold value differential value Dthd). The "second steering state" is a state in which the steering wheel 20 is gripped by the driver, and is a state in which the driver does not even try to release the steering wheel 20. That is, the "second steering state" is a state in which it is certain that the steering wheel 20 is gripped by the driver.

In a case where the CPU determines that the "second steering state" has occurred, when a situation where the CPU can clearly determine that the driver tries to release the steering wheel 20 (situation where the sensor differential value D is equal to or less than the first threshold value differential value Dthd) occurs, it is not certain that the steering wheel 20 is gripped by the driver. That is, a possibility that the steering wheel 20 is not gripped by the driver is high. In this case, the CPU determines that the "hands-off state" has occurred.

According to the second device, even in a case where the temperature of the steering wheel 20 changes, the state in which the steering wheel 20 is gripped by the driver can be detected more precisely.

According to the second device, in a case where the CPU determines the "first steering state" or the "second steering state", which is a state in which it is certain that the steering wheel 20 is gripped by the driver, the first determination result (steering state determination result) is output.

Therefore, a possibility that the second determination result (hands-off state determination result) will be output even though a transition from the "state in which the steering wheel 20 is gripped by the driver" to the "state in which the steering wheel 20 is not gripped by the driver" does not occur can be reduced.

As a result, for example, in a case where the second device is used in a system for calling driver's attention based on the second determination result (hands-off state determination result), a possibility that the warning will be needlessly issued can be reduced.

According to the second device, in a case where the CPU determines the "hands-off state", which is a state in which it is certain that the steering wheel 20 is not gripped by the driver or a state in which a possibility that the steering wheel 20 is not gripped by the driver is high, the second determination result (hands-off state determination result) is output.

Therefore, a possibility that the second determination result (hands-off state determination result) will not be output even though a transition from the "state in which the steering wheel 20 is gripped by the driver" to the "state in which the steering wheel 20 is not gripped by the driver" occurs can be reduced.

As a result, for example, in a case where the second device is used in a system for calling driver's attention based on the second determination result (hands-off state determination result), a possibility that the warning will not be issued when the warning is needed can be reduced.

First Modification Example

Next, a gripping state detection device (hereinafter, may be referred to as a "first modified device") according to a first modification example of the disclosure will be described. The first modified device is different from the first device only in the following points. The features of the first modified device can also be applied to the second device. The first modified device executes a first steering state determination routine shown in FIG. 10 that replaces the first steering state determination routine shown in FIG. 3, a second steering state and hands-off state determination routine that is the same as the routine shown in FIG. 4, and a hands-off state and sensor invalid state determination routine shown in FIG. 11 that replaces the hands-off state determination routine shown in FIG. 5. Hereinafter, the differences will be mainly described.

Overview of Operation

Figure 9:
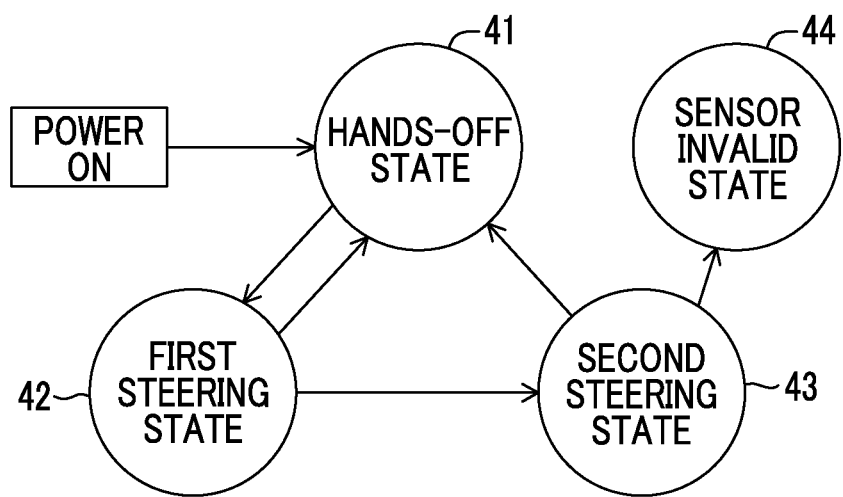
FIG. 9 is a state transition diagram for describing the operation of the steering state determination ECU.

Next, an overview of the operation of the first modified device will be described. The first modified device is different from the first device only in that there is a timer setting in the state 43 in which the determined state is the "second steering state". As shown in FIG. 9, when the state 43 in which the determined state is the "second steering state" continues for a predetermined time, the state of the steering state determination ECU 30 transitions to a state 44 in which the determined state is a "sensor invalid state" from the state 43. The "sensor invalid state" is also referred to as a "detection invalid state" for the sake of convenience.

Specific Operation

Next, a specific operation of the CPU will be described. First, the first steering state determination routine will be described with reference to FIG. 10. The CPU starts processing from step 1000 of the first steering state determination routine at a predetermined timing. In step 1010, the CPU determines whether or not all of the values of the first steering state determination flag Xhda, the second steering state determination flag Xmna, and a sensor invalid state determination flag Xmko are "0". Except for the above, the first steering state determination routine is the same as the first steering state determination routine shown in FIG. 3.

In a case where the ignition key switch is at the ON position, the first steering state determination routine, the second steering state determination routine, and the hands-off state and sensor invalid state determination routine are started each time a predetermined time passes. In the initial routine described above, the first steering state determination flag Xhda, the second steering state determination flag Xmna, and the sensor invalid state determination flag Xmko are initialized (Xhda=0, Xmna=0, Xmko=0).

In a case where all of the values of the first steering state determination flag Xhda, the second steering state determination flag Xmna, and the sensor invalid state determination flag Xmko are "0", this indicates that the CPU determines that the "hands-off state" has occurred. In a case where the value of the sensor invalid state determination flag Xmko is "1", this indicates that the CPU determines that the "sensor invalid state" has occurred. In this case, the CPU outputs the second determination result (hands-off state determination result). The contents of the definition of the values of other flags are as described above.

In a case where all of the values of the first steering state determination flag Xhda, the second steering state determination flag Xmna, and the sensor invalid state determination flag Xmko are "0", the CPU determines "Yes" in step 1010, and performs processing of appropriate steps among steps 320 to 350. Then, the CPU executes processing of step 355, and then proceeds to step 1095 to temporarily end the routine.

On the other hand, in a case where any of the values of the first steering state determination flag Xhda, the second steering state determination flag Xmna, and the sensor invalid state determination flag Xmko is not "0", the CPU determines "No" in step 1010, and proceeds to step 1095 to temporarily end the routine.

Next, the second steering state and hands-off state determination routine will be described. In the second steering state and hands-off state determination routine, processing of the same routine as the second steering state and hands-off state determination routine shown in FIG. 4 is performed.

Next, the hands-off state and sensor invalid state determination routine will be described with reference to FIG. 11. The CPU starts processing from step 1100 of the hands-off state and sensor invalid state determination routine at a predetermined timing, and proceeds to step 1115. In step 1115, the CPU determines whether or not the value of the sensor invalid state determination flag Xmko is "0".

In a case where the value of the sensor invalid state determination flag Xmko is "0", the CPU determines "Yes" in step 1115, and proceeds to step 1120 to determine whether or not the value of the second steering state determination flag Xmna is "1". In a case where the value of the second steering state determination flag Xmna is "1", the CPU determines "Yes" in step 1120, and proceeds to step 1130 to determine whether or not the sensor differential value D is equal to or less than the first threshold value differential value Dthd.

In a case where the sensor differential value D is larger than the first threshold value differential value Dthd, the CPU determines "No" in step 1130, and proceeds to step 1170 to determine whether or not a second steering timer t1 is equal to or greater than a predetermined sensor invalid state determination time t1th. The value of the second steering timer t1 indicates a time for which the state 42 in which the determined state is the "second steering state" continues.

In a case where the second steering timer t1 is smaller than the predetermined sensor invalid state determination time t1th, the CPU determines "No" in step 1170, and proceeds to step 1190 to increase the value of the second steering timer t1 by "1". In this case, the value of the second steering state determination flag Xmna is still "1", and the value of the sensor invalid state determination flag Xmko is still "0". Therefore, the CPU determines that the second steering state has occurred. Then, the CPU proceeds to step 1192 to output a determination result (first determination result (steering state determination result)) according to the determined state (that is, the second steering state indicated by Xhda=0, Xmna=1, and Xmko=0) of the CPU. Then, the CPU proceeds to step 1195 to temporarily end the routine.

On the other hand, in a case where the second steering timer t1 is equal to or greater than the predetermined sensor invalid state determination time t1th, the CPU determines "Yes" in step 1170, and proceeds to step 1180 to set the value of the second steering state determination flag Xmna to "0" and set the value of the sensor invalid state determination flag Xmko to "1". That is, the CPU determines that the "sensor invalid state" has occurred. Then, the CPU proceeds to step 1192 to output a determination result (second determination result (hands-off state determination result)) according to the determined state (that is, the sensor invalid state indicated by Xhda=0, Xmna=0, and Xmko=1) of the CPU. Then, the CPU proceeds to step 1195 to temporarily end the routine.

In a case where the value of the sensor invalid state determination flag Xmko is not "0" (that is, in a case where the value of the sensor invalid state determination flag Xmko is "1") at the time when the CPU executes the processing of step 1115, the CPU determines "No" in step 1115. Then, the CPU proceeds to step 1192 to output a determination result (second determination result (hands-off state determination result)) according to the determined state (that is, the sensor invalid state indicated by Xhda=0, Xmna=0, and Xmko=1) of the CPU. Then, the CPU proceeds to step 1195 to temporarily end the routine.

In a case where the sensor differential value D is equal to or less than the threshold value Dthd at the time when the CPU executes the processing of step 1130, the CPU determines "Yes" in step 1130, and proceeds to step 1140 to set the value of the second steering state determination flag Xmna to "0". That is, the CPU determines that the "hands-off state" has occurred. At this time, the value of the sensor invalid state determination flag Xmko is set to "0".

Then, the CPU proceeds to step 1150 to update the reference sensor value S0 recorded in the RAM to the current sensor value S. Then, a value (=S0+S_diff) obtained by adding the threshold change amount S_diff to the updated reference sensor value S0 is set as the updated threshold value Sth. Then, the CPU proceeds to step 1160 to set the value of second steering timer t1 to "0". Then, the CPU proceeds to step 1192 to output a determination result (second determination result (hands-off state determination result)) according to the determined state (that is, the hands-off state indicated by Xhda=0, Xmna=0, and Xmko=0) of the CPU. Then, the CPU proceeds to step 1195 to temporarily end the routine.

In a case where the value of the second steering state determination flag Xmna is not "1" at the time when the CPU executes the processing of step 1120, the CPU determines "No" in step 1120. Then, the CPU proceeds to step 1195 to temporarily end the routine.

According to the first modified device, the same effect as in the first device is obtained. According to the first modified device, the following effect is further obtained.

When the CPU determines that the "second steering state" has occurred, the steering state determination ECU 30 of the first modified device determines that the second steering state continues as long as the sensor differential value D is not equal to or less than the first threshold value differential value Dthd, and continues to output the first determination result (steering state determination result). However, in a state in which the CPU determines the "second steering state", the occurrence of a case where the sensor differential value D does not become equal to or less than the first threshold electrostatic capacitance differential value Dthd over a long period of time (for example, one hour) is very rare. In such a case, therefore, it is considered that the electrostatic capacitance sensor 21 does not correctly detect the electrostatic capacitance for some reason. Accordingly, continuing to determine that the second steering state has occurred in such a case is not appropriate.

Therefore, the steering state determination ECU 30 of the first modified device determines that the "sensor invalid state" has occurred and outputs the second determination result (hands-off state determination result) when the time for which the steering state determination ECU 30 determines that the "second steering state" has occurred (time indicated by the second steering timer t1) becomes equal to or greater than a predetermined time (sensor invalid state determination time t1th).

As a result, for example, in a case where the first modified device is used in a system for calling driver's attention based on the second determination result (hands-off state determination result), a "possibility that the warning will not be issued for a long time when the warning is originally needed can be reduced.

Third Embodiment

Figure 12A:
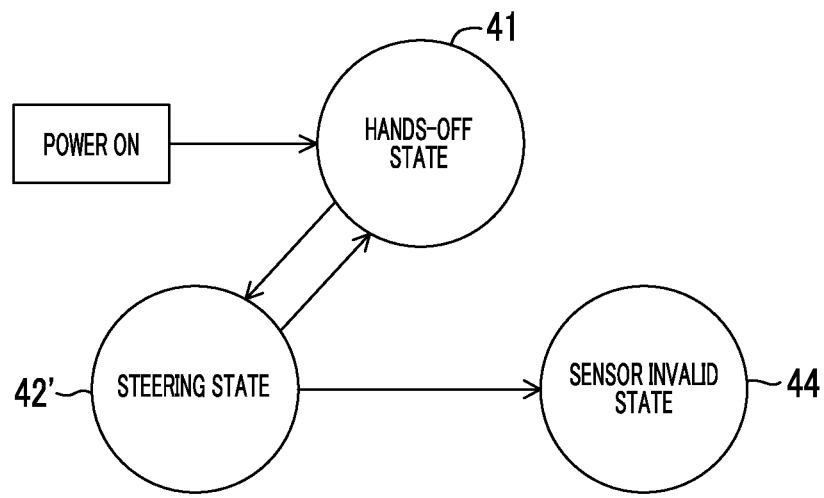
FIG. 12A is a state transition diagram for describing the operation of the steering state determination ECU.
Figure 12B:
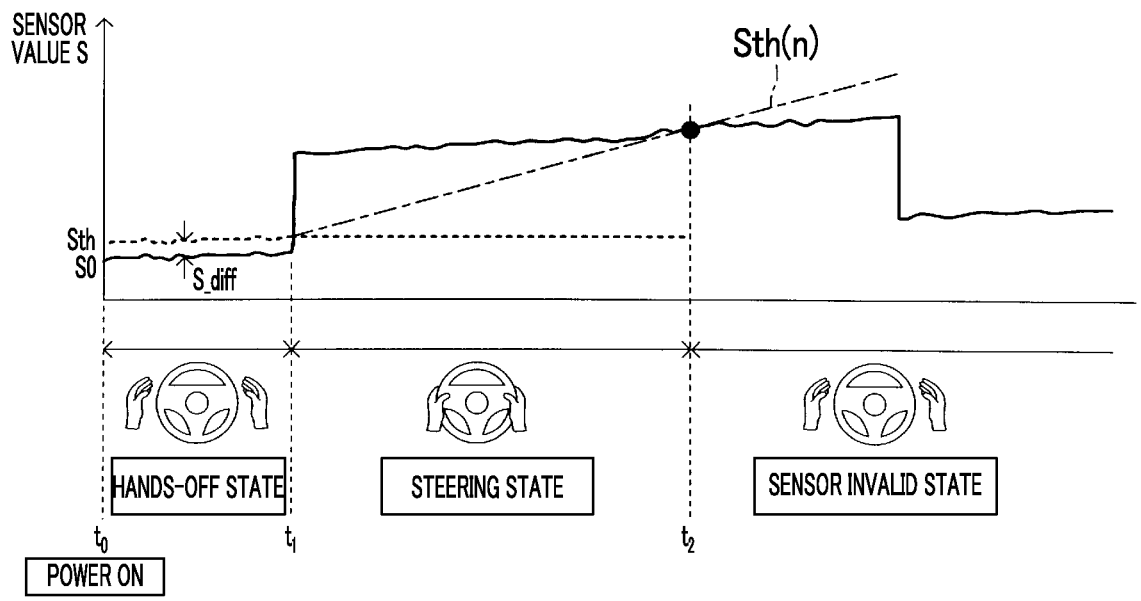
FIG. 12B is a time chart for describing the operation of the steering state determination ECU.

Next, a gripping state detection device (hereinafter, may be referred to as a "third device") according to a third embodiment of the disclosure will be described. The third device is different from the first device only in the following points. (1) A steering state determination ECU 30 of the third device repeatedly determines whether or not any of the following "hands-off state", "steering state", and "sensor invalid state" has occurred based on the sensor value S. The "hands-off state" is a state in which it is certain that the steering wheel 20 is not gripped by the driver. The "steering state" is a state in which it is certain that the steering wheel 20 is gripped by the driver. The "sensor invalid state" is a state in which whether or not the steering wheel 20 is gripped by the driver cannot be specified. (2) As shown in FIGS. 12A and 12B, when the state of the steering state determination ECU 30 is a state 42' in which the determined state is the "steering state", the third device determines that the "sensor invalid state" has occurred in a case where the sensor value S is smaller than the temperature correction threshold value Sth(n) shown by the one-dot chain line. That is, the third device transitions from the state 42' to the state 44 in which the determined state of the steering state determination ECU 30 is the "sensor invalid state". The third device performs a steering state determination routine shown in FIG. 13 that replaces the routine shown in FIG. 3 and a hands-off state and sensor invalid state determination routine shown in FIG. 14 that replaces the routine shown in FIG. 4. The routine shown in FIG. 5 is not performed. Hereinafter, the differences will be mainly described.

Specific Operation

Next, a specific operation of the CPU will be described. The CPU executes each of the steering state determination routine shown in FIG. 13 and the hands-off state and sensor invalid state determination routine shown in FIG. 14 each time a predetermined time passes.

In a case where the value of a steering state determination flag Xhd is "1", this indicates that the CPU determines that the "steering state" has occurred. In this case, the CPU outputs a first determination result (steering state determination result). In a case where the value of the sensor invalid state determination flag Xmko is "1", this indicates that the CPU determines that the "sensor invalid state" has occurred. In this case, the CPU outputs a second determination result indicating the "hands-off state" (hands-off state determination result). In a case where both the values of the steering state determination flag Xhd and the sensor invalid state determination flag Xmko are "0", this indicates that the CPU determines that the "hands-off state" has occurred. In this case, the CPU outputs the first determination result (steering state determination result).

Figure 13:
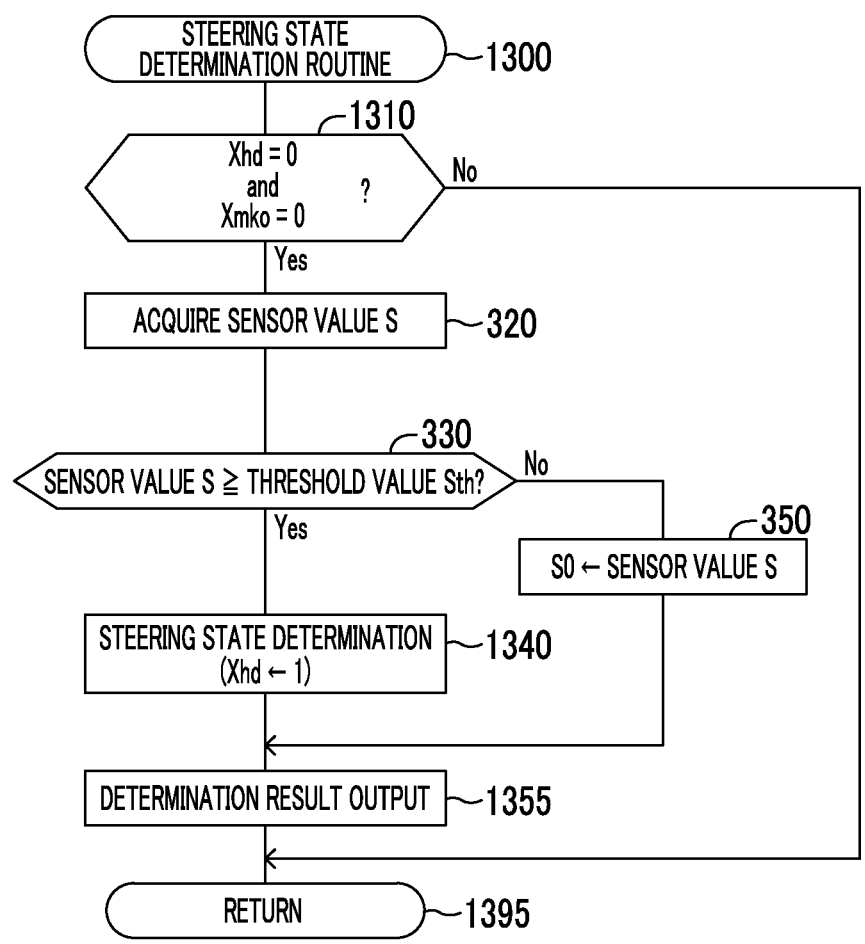
FIG. 13 is a flowchart showing the steering state determination routine executed by the CPU of the steering state determination ECU.
Figure 14:
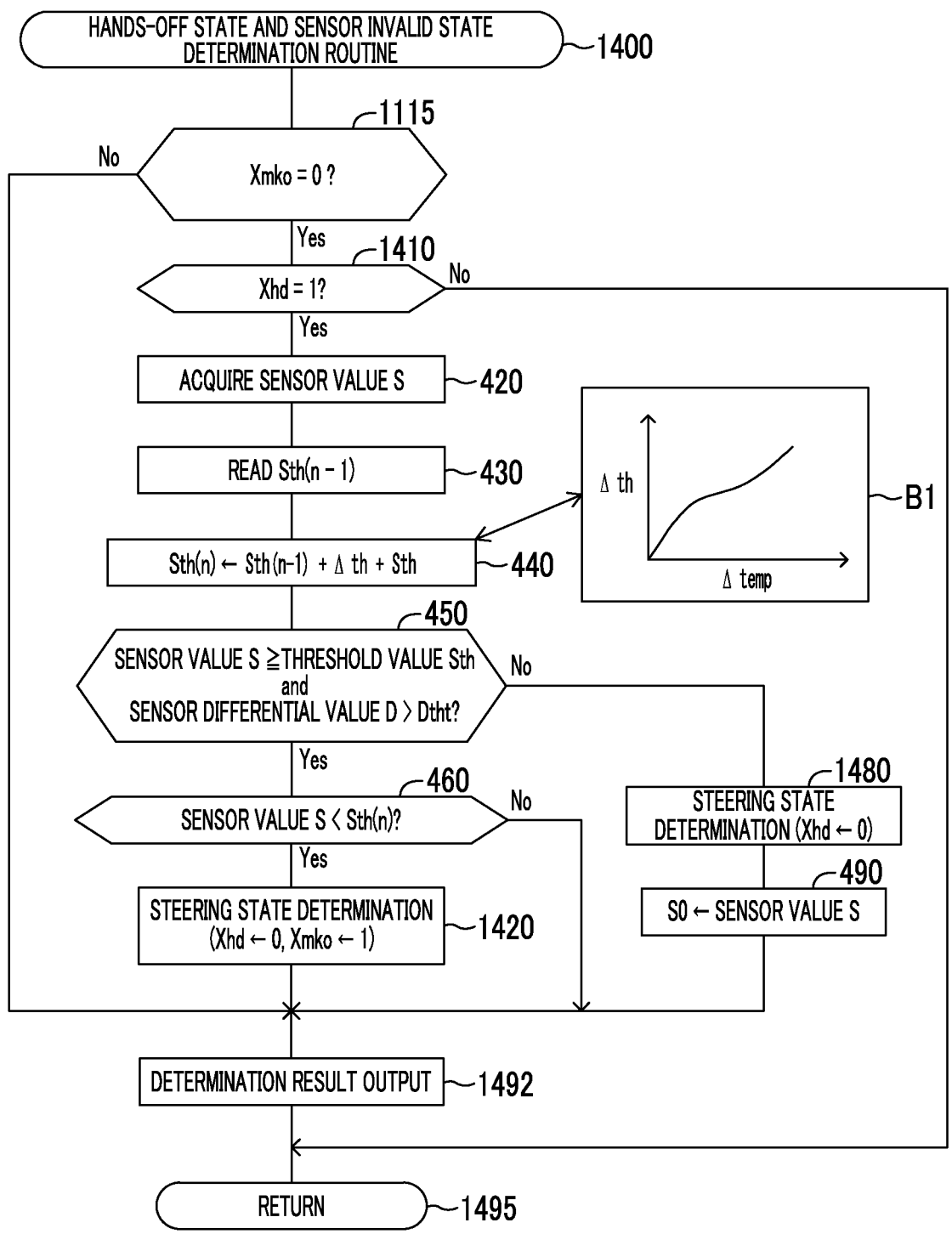
FIG. 14 is a flowchart showing the hands-off state and sensor invalid state determination routine executed by the CPU of the steering state determination ECU.

In a case where the ignition key switch is at the ON position, the routines shown in FIGS. 13 and 14 are started each time a predetermined time passes. Since the steering state determination flag Xhd and the sensor invalid state determination flag Xmko are initialized (Xhd=0, Xmko=0), the state of the steering state determination ECU 30 becomes the state 41 in which the current determined state is the "hands-off state". In this case, the steering state determination routine works substantially.

Hereinafter, the steering state determination routine will be described with reference to FIG. 13. The CPU starts processing from step 1300 of the steering state determination routine at a predetermined timing, and proceeds to step 1310. In step 1310, the CPU determines whether or not both the values of the steering state determination flag Xhd and the sensor invalid state determination flag Xmko are "0".

In a case where both the values of the steering state determination flag Xhd and the sensor invalid state determination flag Xmko are "0", the CPU determines "Yes" in step 1310, and proceeds to step 320 to execute processing of step 320. Then, the CPU proceeds to step 330 to determine whether or not the sensor value S is equal to or greater than the threshold value Sth.

In a case where the sensor value S is equal to or greater than the threshold value Sth, the CPU determines "Yes" in step 330, and proceeds to step 1340 to set the value of the steering state determination flag to "1". That is, the CPU determines that the "steering state" has occurred. Then, the CPU proceeds to step 1355 to output a determination result (first determination result (steering state determination result)) according to the determined state (that is, the steering state indicated by Xhd=1 and Xmko=0) of the CPU. Then, the CPU proceeds to step 1395 to temporarily end the routine.

On the other hand, in a case where the sensor value S is smaller than the threshold value Sth, the CPU determines "No" in step 330, and proceeds to step 350 to execute processing of step 350. Then, the CPU proceeds to step 1355 to output a determination result (second determination result (hands-off state determination result)) according to the determined state (that is, the hands-off state indicated by Xhd=0 and Xmko=0) of the CPU. Then, the CPU proceeds to step 1395 to temporarily end the routine.

In a case where at least one of the values of the steering state determination flag Xhd and the sensor invalid state determination flag Xmko is not "0" at the time when the CPU executes the processing of step 1310, the CPU determines "No" in step 1310, and proceeds to step 1395 to temporarily end the routine.

Next, the hands-off state and sensor invalid state determination routine will be described with reference to FIG. 14. The CPU starts processing from step 1400 of the hands-off state and sensor invalid state determination routine at a predetermined timing, and proceeds to step 1115. In step 1115, the CPU determines whether or not the value of the sensor invalid state determination flag Xmko is "0".

In a case where the value of the sensor invalid state determination flag Xmko is "0", the CPU determines "Yes" in step 1115, and proceeds to step 1410 to determine whether or not the value of the steering state determination flag Xhd is "1".

In a case where the value of the steering state determination flag Xhd is "1", the CPU determines "Yes" in step 1410, and performs processing of steps 420 to 450 in order.

In a case where the sensor value S is equal to or greater than the threshold value Sth and the sensor differential value D is larger than the second threshold value differential value Dtht at the time of executing the processing of step 450, the CPU determines "Yes" in step 450, and proceeds to step 460. In a case where the sensor value S is smaller than the temperature correction threshold value Sth(n) at the time of executing the processing of step 460, the CPU determines "Yes" in step 460, and proceeds to step 1420 to set the value of the steering state determination flag Xhd to "0" and set the value of the sensor invalid state determination flag Xmko to "1". That is, the CPU determines that the "sensor invalid state" has occurred. Then, the CPU proceeds to step 1492 to output a determination result (second determination result (hands-off state determination result)) according to the determined state (that is, the sensor invalid state indicated by Xhd=0 and Xmko=1) of the CPU. Then, the CPU proceeds to step 1495 to temporarily end the routine.

In a case where the value of the sensor invalid state determination flag Xmko is not "0" (that is, in a case where the value of the sensor invalid state determination flag is "1") at the time when the CPU executes the processing of step 1115, the CPU determines "No" in step 1115. Then, the CPU proceeds to step 1492 to output a determination result (second determination result (hands-off state determination result)) according to the determined state (that is, the sensor invalid state indicated by Xmko=1 and Xhd=0) of the CPU. Then, the CPU proceeds to step 1195 to temporarily end the routine.

In at least one of a case where the sensor value S is smaller than the threshold value Sth and a case where the sensor differential value D is equal to or less than the second threshold value differential value Dtht at the time executing the processing of step 450, the CPU determines "No" in step 450. Then, the CPU proceeds to step 1480 to set the value of the steering state determination flag Xhd to "0". That is, the CPU determines that the "hands-off state" has occurred. Then, the CPU executes processing of step 490, and proceeds to step 1492 to output a determination result (second determination result (hands-off state determination result)) according to the determined state (that is, the hands-off state indicated by Xhd=0 and Xmko=0) of the CPU. Then, the CPU proceeds to step 1495 to temporarily end the routine.

In a case where the sensor value S is equal to or greater than the temperature correction threshold value Sth(n) at the time of executing the processing of step 460, the CPU determines "No" in step 460. Then, the CPU proceeds to step 1492 to output a determination result (first determination result (steering state determination result)) according to the determined state (that is, the steering state indicated by Xhd=1 and Xmko=0) of the CPU. Then, the CPU proceeds to step 1495 to temporarily end the routine.

In a case where the value of the steering state determination flag Xhd is not "0" at the time of executing the processing of step 1410, the CPU determines "No" in step 1410, and proceeds to step 1495 to temporarily end the routine.

According to the third device, during a period in which whether or not the steering wheel 20 is gripped by the driver cannot be specified (in a case where the sensor value S is smaller than the temperature correction threshold value Sth(n)), the CPU determines that the "sensor invalid state" has occurred. In a case where the "sensor invalid state" is determined, the second determination result (hands-off state determination result) is output.

Therefore, a possibility that the gripping state of the driver with respect to the steering wheel 20 will be erroneously determined in a period other than the above period (determined state as a sensor invalid state) can be avoided. During the period, a possibility that the second determination result will not be output despite the "state in which the steering wheel 20 is not gripped by the driver" can be avoided.

Fourth Embodiment

Figure 15A:
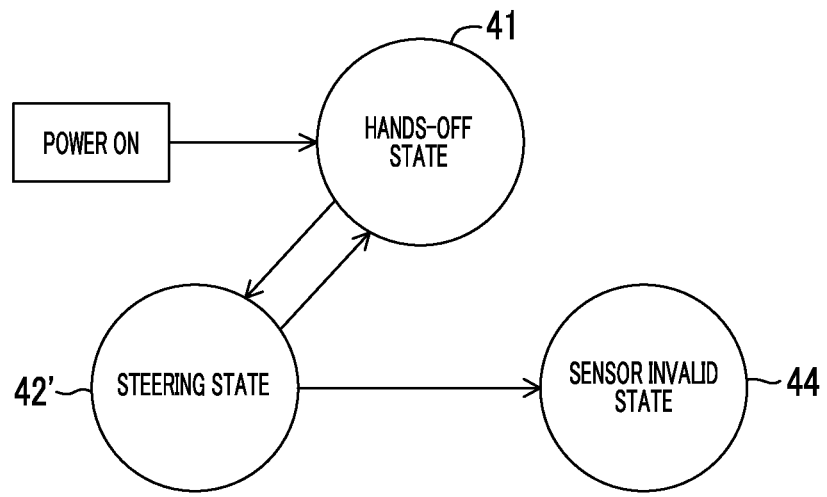
FIG. 15A is a state transition diagram for describing the operation of the steering state determination ECU.
Figure 15B:
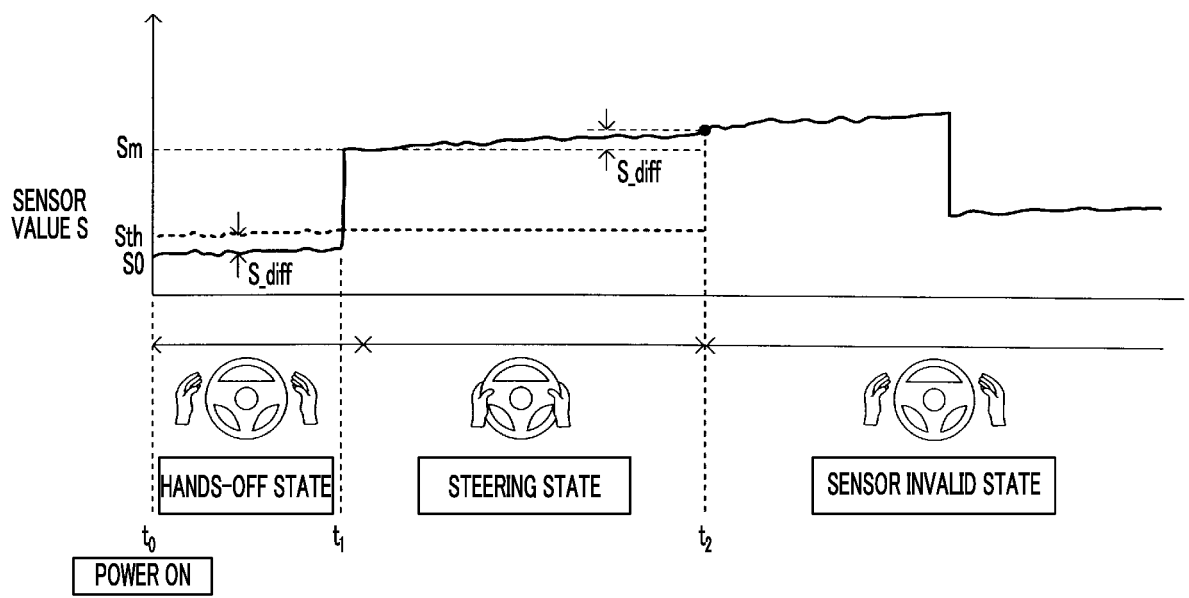
FIG. 15B is a time chart for describing the operation of the steering state determination ECU.

Next, a gripping state detection device (hereinafter, may be referred to as a "fourth device") according to a fourth embodiment of the disclosure will be described. The fourth device is different from the second device only in the following points. (1) A steering state determination ECU 30 of the fourth device repeatedly determines whether or not any of the following "hands-off state", "steering state", and "sensor invalid state" has occurred based on the sensor value S. The "hands-off state" is a state in which it is certain that the steering wheel 20 is not gripped by the driver. The "steering state" is a state in which it is certain that the steering wheel 20 is gripped by the driver. The "sensor invalid state" is a state in which whether or not the steering wheel is gripped by the driver cannot be specified. (2) As shown in FIGS. 15A and 15B, when the state of the steering state determination ECU 30 is a state 42' in which the determined state is the "steering state", the fourth device determines that the "sensor invalid state" has occurred in a case where the value of the difference "S−Sm" is equal to or greater than the threshold change amount S_diff. That is, the fourth device transitions from the state 42' to the state 44 in which the determined state is the "sensor invalid state". The fourth device performs each of a steering state determination routine shown in FIG. 16 that replaces the routine shown in FIG. 7 and a hands-off state and sensor invalid state determination routine shown in FIG. 17 that replaces the routine shown in FIG. 8. The same routine as the routine shown in FIG. 5 is not performed.

Specific Operation

Next, a specific operation of the CPU will be described. The CPU executes each of the steering state determination routine shown in FIG. 16 and the hands-off state and sensor invalid state determination routine shown in FIG. 17 each time a predetermined time passes.

Figure 16:
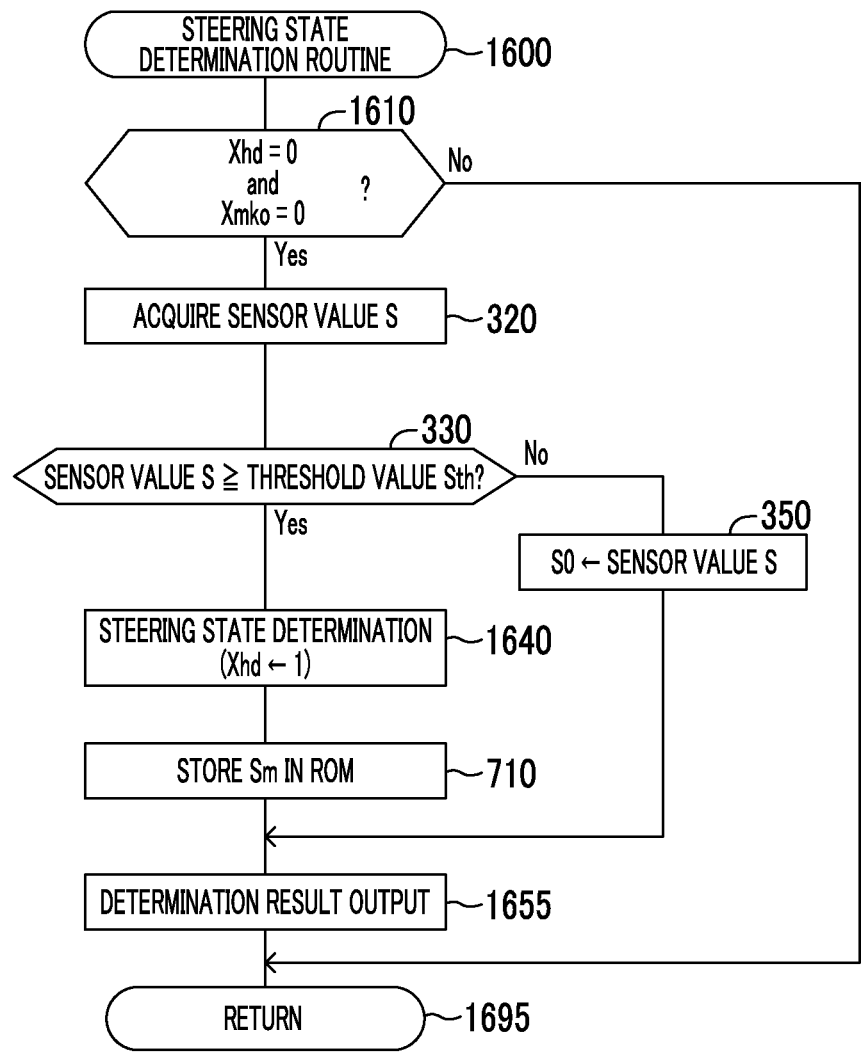
FIG. 16 is a flowchart showing the steering state determination routine executed by the CPU of the steering state determination ECU.
Figure 17:
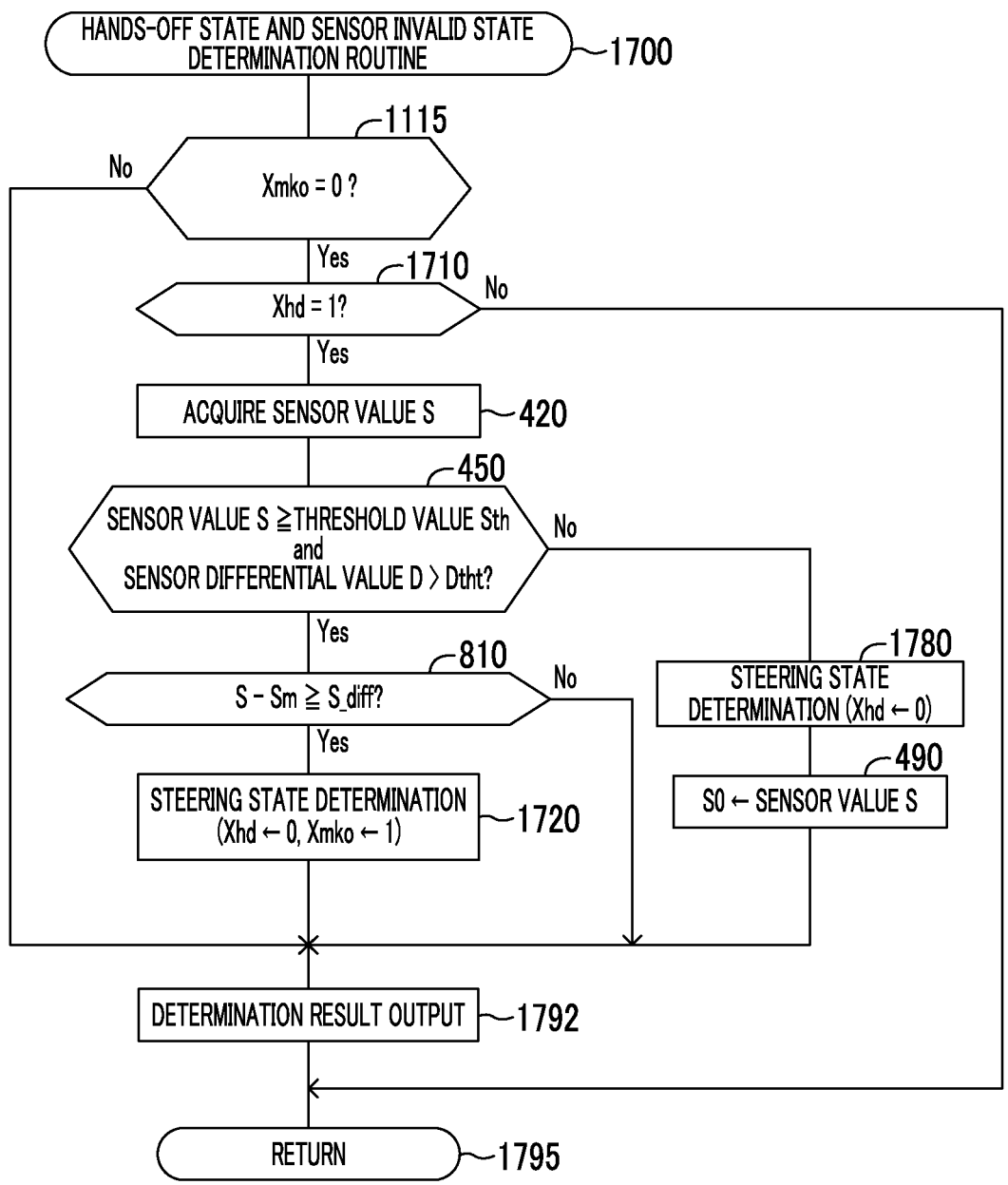
FIG. 17 is a flowchart showing the hands-off state and sensor invalid state determination routine executed by the CPU of the steering state determination ECU.

In a case where the ignition key switch is at the ON position, the routines shown in FIGS. 16 and 17 are started each time a predetermined time passes. Since the steering state determination flag Xhd and the sensor invalid state determination flag Xmko are initialized (Xhd=0, Xmko=0), the state of the steering state determination ECU 30 becomes the state 41 in which the current determined state is the "hands-off state". In this case, the steering state determination routine works substantially.

Hereinafter, the steering state determination routine will be described with reference to FIG. 16. The CPU starts processing from step 1600 of the steering state determination routine at a predetermined timing, and proceeds to step 1610. In step 1610, the CPU determines whether or not both the values of the steering state determination flag Xhd and the sensor invalid state determination flag Xmko are "0".

In a case where both the values of the steering state determination flag Xhd and the sensor invalid state determination flag Xmko are "0", the CPU determines "Yes" in step 1610, and proceeds to step 320 to execute processing of step 320. Then, the CPU proceeds to step 330 to determine whether or not the sensor value S is equal to or greater than the threshold value Sth.

In a case where the sensor value S is equal to or greater than the threshold value Sth, the CPU determines "Yes" in step 330, and proceeds to step 1640 to set the value of the steering state determination flag to "1". That is, the CPU determines that the "steering state" has occurred. Then, the CPU proceeds to step 710 to execute processing of step 710. Then, the CPU proceeds to step 1655 to output a determination result (first determination result (steering state determination result)) according to the determined state (that is, a steering state indicated by Xhd=1 and Xmko=0) of the CPU. Then, the CPU proceeds to step 1695 to temporarily end the routine.

On the other hand, in a case where the sensor value S is smaller than the threshold value Sth, the CPU determines "No" in step 330, and proceeds to step 350 to execute processing of step 350. Then, the CPU proceeds to step 1655 to output a determination result (second determination result (hands-off state determination result)) according to the determined state (that is, the hands-off state indicated by Xhd=0 and Xmko=0) of the CPU. Then, the CPU proceeds to step 1695 to temporarily end the routine.

In a case where at least one of the values of the steering state determination flag Xhd and the sensor invalid state determination flag Xmko is not "0" at the time when the CPU executes the processing of step 1610, the CPU determines "No" in step 1610, and proceeds to step 1695 to temporarily end the routine.

Next, the hands-off state and sensor invalid state determination routine will be described with reference to FIG. 17. The CPU starts processing from step 1700 of the hands-off state and sensor invalid state determination routine at a predetermined timing, and proceeds to step 1115. In step 1115, the CPU determines whether or not the value of the sensor invalid state determination flag Xmko is "0".

In a case where the value of the sensor invalid state determination flag Xmko is "0", the CPU determines "Yes" in step 1115, and proceeds to step 1710 to determine whether or not the value of the steering state determination flag Xhd is "1".

In a case where the value of the steering state determination flag Xhd is "1", the CPU determines "Yes" in step 1710, and performs processing of steps 420 and 450 in order.

In a case where the sensor value S is equal to or greater than the threshold value Sth and the sensor differential value D is larger than the second threshold value differential value Dtht at the time of executing the processing of step 450, the CPU determines "Yes" in step 450, and proceeds to step 810. In a case where the value of the difference "S−Sm" is smaller than the threshold change amount S_diff at the time of executing the processing of step 810, the CPU determines "Yes" in step 810, and proceeds to step 1720 to set the value of the steering state determination flag Xhd to "0" and set the value of the sensor invalid state determination flag Xmko to "1". That is, the CPU determines that the "sensor invalid state" has occurred. Then, the CPU proceeds to step 1792 to output a determination result (second determination result (hands-off state determination result)) according to the determined state (that is, the sensor invalid state indicated by Xhd=0 and Xmko=1) of the CPU. Then, the CPU proceeds to step 1795 to temporarily end the routine.

In a case where the value of the sensor invalid state determination flag Xmko is not "0" (that is, in a case where the value of the sensor invalid state determination flag is "1") at the time when the CPU executes the processing of step 1115, the CPU determines "No" in step 1115. Then, the CPU proceeds to step 1492 to output a determination result (second determination result (hands-off state determination result)) according to the determined state (that is, the sensor invalid state indicated by Xmko=1 and Xhd=0) of the CPU. Then, the CPU proceeds to step 1195 to temporarily end the routine.

In at least one of a case where the sensor value S is smaller than the threshold value Sth and a case where the sensor differential value D is equal to or less than the second threshold value differential value Dtht at the time of executing the processing of step 450, the CPU determines "No" in step 450. Then, the CPU proceeds to step 1780 to set the value of the steering state determination flag Xhd to "0". That is, the CPU determines that the "hands-off state" has occurred. Then, the CPU executes processing of step 490, and proceeds to step 1792 to output a determination result (second determination result (hands-off state determination result)) according to the determined state (that is, the hands-off state indicated by Xhd=0 and Xmko=0) of the CPU. Then, the CPU proceeds to step 1795 to temporarily end the routine.

In a case where the value of the difference "S−Sm" is smaller than the threshold change amount S_diff at the time of executing the processing of step 810, the CPU determines "No" in step 810. Then, the CPU proceeds to step 1792 to output a determination result (first determination result (steering state determination result)) according to the determined state (that is, a steering state indicated by Xhd=1 and Xmko=0) of the CPU. Then, the CPU proceeds to step 1795 to temporarily end the routine.

In a case where the value of the steering state determination flag Xhd is not "0" at the time of executing the processing of step 1710, the CPU determines "No" in step 1710, and proceeds to step 1795 to temporarily end the routine.

According to the fourth device, during a period in which whether or not the steering wheel 20 is gripped by the driver cannot be specified (in a case where the value of the difference "S−Sm" is equal to or greater than the threshold change amount S_diff), the CPU determines that the "sensor invalid state" has occurred. In a case where the "sensor invalid state" is determined, the second determination result (hands-off state determination result) is output.

Therefore, a possibility that the gripping state of the driver with respect to the steering wheel 20 will be erroneously determined in a period other than the above period (determined state as a sensor invalid state) can be reduced. During the period, a possibility that the second determination result will not be output despite the "state in which the steering wheel 20 is not gripped by the driver" can be avoided.

MODIFICATION EXAMPLES

While the embodiments of the disclosure have been specifically described above, the disclosure is not limited to the above-described embodiments, and various modification examples based on the technical idea of the disclosure can be adopted.

For example, in each of the first device and the second device, the steering state determination ECU 30 may first determine whether or not the vehicle 10 includes the temperature sensor 25. In this case, the steering state determination ECU 30 can be configured such that the steering state determination ECU 30 functions as the first device to detect the gripping state in a case where the steering state determination ECU 30 determines that the "vehicle 10 includes the temperature sensor 25" and functions as the second device to detect the gripping state in a case where the steering state determination ECU 30 determines that the "vehicle 10 does not include the temperature sensor 25".

The steering state determination ECU 30 may directly calculate the temperature correction threshold value Sth(n) based on the temperature temp acquired from the temperature sensor 25 instead of the processing of steps 430 and 440 of FIGS. 4 and 14. The device of each of the embodiments described above may be applied to a device for monitoring the state of the driver instead of a hands-off warning.

What is claimed is:

1. A gripping state detection device, comprising:
   an electrostatic capacitance measuring unit configured to measure an electrostatic capacitance that changes according to a gripping state of a driver with respect to a steering wheel of a vehicle;
   a temperature detector that detects a temperature of the steering wheel; and
   a controller configured to
      determine which of a first steering state that is a state in which it is certain that the steering wheel is gripped by the driver, a second steering state that is a state transitioning from the first steering state and is a state in which it is certain that the steering wheel is gripped by the driver, and a hands-off state that is a state in which it is certain that the steering wheel is not gripped by the driver or a possibility that the steering wheel is not gripped by the driver is high has occurred based on the electrostatic capacitance and
      output a first determination result, which indicates that the steering wheel is gripped by the driver, in a case where the determined state is the first steering state or the second steering state and, output a second determination result, which indicates that the steering wheel is not gripped by the driver, in a case where the determined state is the hands-off state, wherein the controller is configured to
i) in a case where the determined state is the hands-off state, subsequently determine that the first steering state has occurred when the controller determines that the electrostatic capacitance is equal to or greater than a first threshold electrostatic capacitance
ii) in a case where the determined state is the first steering state, subsequently determine that the second steering state has occurred when the controller determines that the electrostatic capacitance is smaller than a second threshold electrostatic capacitance, which increases as the temperature increases, and
iii) in a case where the determined state is the second steering state, subsequently determine that the hands-off state has occurred when the controller determines that an electrostatic capacitance differential value, which is an amount of change per unit elapsed time of the electrostatic capacitance, is equal to or less than a first threshold electrostatic capacitance differential value.

2. The gripping state detection device according to claim 1, wherein, in a case where the controller determines that the first steering state has occurred, the controller is configured to subsequently determine that the hands-off state has occurred at least either when the controller determines that the electrostatic capacitance is smaller than the first threshold electrostatic capacitance or when the controller determines that the electrostatic capacitance differential value is equal to or less than a second threshold electrostatic capacitance differential value, which is a value smaller than the first threshold electrostatic capacitance differential value.

3. The gripping state detection device according to claim 1, wherein the controller is configured to determine that the electrostatic capacitance measuring unit is in a detection invalid state and output the second determination result in a case where the controller determines that a period in which the second steering state is determined is equal to or longer than a predetermined time.

4. A gripping state detection device, comprising:
an electrostatic capacitance measuring unit configured to measure an electrostatic capacitance that changes according to a gripping state of a driver with respect to a steering wheel of a vehicle; and
a controller configured to
determine which of a first steering state that is a state in which it is certain that the steering wheel is gripped by the driver, a second steering state that is a state transitioning from the first steering state and is a state in which it is certain that the steering wheel is gripped by the driver, and a hands-off state that is a state in which it is certain that the steering wheel is not gripped by the driver or a possibility that the steering wheel is not gripped by the driver is high has occurred based on the electrostatic capacitance and
output a first determination result, which indicates that the steering wheel is gripped by the driver, in a case where the determined state is the first steering state or the second steering state and, output a second determination result, which indicates that the steering wheel is not gripped by the driver, in a case where the determined state is the hands-off state,
wherein the controller is configured to
i) in a case where the determined state is the hands-off state, subsequently determine that the first steering state has occurred when the controller determines that the electrostatic capacitance is equal to or greater than a first threshold electrostatic capacitance,
ii) in a case where the determined state is the first steering state, subsequently determine that the second steering state has occurred when the controller determines that an amount of increase in the electrostatic capacitance with respect to the electrostatic capacitance at a time when the controller determines the first steering state is equal to or greater than a threshold change amount, and
iii) in a case where the determined state is the second steering state, subsequently determine that the hands-off state has occurred when the controller determines that an electrostatic capacitance differential value, which is an amount of change per unit elapsed time of the electrostatic capacitance, is equal to or less than a first threshold electrostatic capacitance differential value.

5. The gripping state detection device according to claim 4, wherein, in a case where the controller determines that the first steering state has occurred, the controller is configured to subsequently determine that the hands-off state has occurred at least either when the controller determines that the electrostatic capacitance is smaller than the first threshold electrostatic capacitance or when the controller determines that the electrostatic capacitance differential value is equal to or less than a second threshold electrostatic capacitance differential value, which is a value smaller than the first threshold electrostatic capacitance differential value.

6. The gripping state detection device according to claim 4, wherein the controller is configured to determine that the electrostatic capacitance measuring unit is in a detection invalid state and output the second determination result in a case where the controller determines that a period in which the second steering state is determined is equal to or longer than a predetermined time.

7. The gripping state detection device according to claim 4, wherein the controller is configured to store the electrostatic capacitance at a time when the first steering state is determined.

8. A gripping state detection device, comprising:
an electrostatic capacitance measuring unit configured to measure an electrostatic capacitance that changes according to a gripping state of a driver with respect to a steering wheel of a vehicle;
a temperature detector that detects a temperature of the steering wheel; and
a controller configured to
determine which of a steering state that is a state in which it is certain that the steering wheel is gripped by the driver, a hands-off state that is a state in which it is certain that the steering wheel is not gripped by the driver, and a detection invalid state that is a state in which whether or not the steering wheel is gripped by the driver is unable to be specified has occurred based on the electrostatic capacitance and
output a first determination result, which indicates that the steering wheel is gripped by the driver, in a case where the determined state is the steering state and, output a second determination result, which indicates that the steering wheel is not gripped by the driver, in a case where the determined state is the hands-off state or the detection invalid state, wherein the controller is configured to
- i) in a case where the determined state is the hands-off state, subsequently determine that the steering state has occurred when the controller determines that the electrostatic capacitance is equal to or greater than a first threshold electrostatic capacitance, and
- ii) in a case where the determined state is the steering state, subsequently determine that the detection invalid state has occurred when the controller determines that the electrostatic capacitance is smaller than a second threshold electrostatic capacitance, which increases as the temperature increases.

9. A gripping state detection device, comprising:
an electrostatic capacitance measuring unit configured to measure an electrostatic capacitance that changes according to a gripping state of a driver with respect to a steering wheel of a vehicle; and
a controller configured to
  determine which of a steering state that is a state in which it is certain that the steering wheel is gripped by the driver, a hands-off state that is a state in which it is certain that the steering wheel is not gripped by the driver, and a detection invalid state that is a state in which whether or not the steering wheel is gripped by the driver is unable to be specified has occurred based on the electrostatic capacitance and
  output a first determination result, which indicates that the steering wheel is gripped by the driver, in a case where the determined state is the steering state and, output a second determination result, which indicates that the steering wheel is not gripped by the driver, in a case where the determined state is the hands-off state or the detection invalid state,
wherein the controller is configured to
  - i) in a case where the determined state is the hands-off state, subsequently determine that the steering state has occurred when the controller determines that the electrostatic capacitance is equal to or greater than a first threshold electrostatic capacitance, and
  - ii) in a case where the determined state is the steering state, subsequently determine that the detection invalid state has occurred when the controller determines that an amount of increase in the electrostatic capacitance with respect to the electrostatic capacitance at a time when the controller determines the steering state is equal to or greater than a threshold change amount.

10. The gripping state detection device according to claim 9, wherein the controller is configured to store the electrostatic capacitance at a time when the steering state is determined.

* * * * *